US005568686A

United States Patent [19]

Suarez

[11] Patent Number: 5,568,686

[45] Date of Patent: Oct. 29, 1996

[54] TOOL FOR ASSEMBLING WIRE CONNECTORS

[75] Inventor: Wilson E. Suarez, Burbank, Calif.

[73] Assignee: PSI Telecommunications, Inc., Burbank, Calif.

[21] Appl. No.: 203,462

[22] Filed: Feb. 28, 1994

[51] Int. Cl.[6] ............................ H01R 43/04; B23P 19/00

[52] U.S. Cl. ............................ 29/861; 29/749; 29/566.3; 29/753

[58] Field of Search .................................. 29/566.3, 861, 29/749, 566.4, 753

[56] References Cited

U.S. PATENT DOCUMENTS 4,148,138 4/1979 Becker et al. .
4,282,644 8/1981 Petree .................................... 29/566.3
4,307,505 12/1981 Jozens ............................... 29/566.3 X
4,422,235 12/1983 Becker et al. .................... 29/566.3 X
5,205,033 4/1993 Drach ................................ 29/566.3 X

*Primary Examiner*—Carl J. Arbes
*Attorney, Agent, or Firm*—Graham & James

[57] ABSTRACT

A lightweight, economical, reliable and adaptable tool for use in joining wire connector assemblies such as those utilized in telecommunications includes a base member including a housing and a cam mechanism with a T-bar pivotally connected with a cam mechanism. Removable wire connector holders are provided which can be interchanged on the base member and force applicators for use with particular wire connectors can be applied to the T-bar. By providing interchangeability for the wire connector holders and the force applicators, the disclosed tool is capable of being utilized with a variety of industry standard wire connector assemblies without requiring multiple tools. In addition, the tool is formed utilizing a simplified construction and is made from materials which reduce the weight, increase the reliability and reduce the cost thereof.

26 Claims, 21 Drawing Sheets

TOOL FOR ASSEMBLING WIRE CONNECTORS

FIELD OF THE INVENTION

The present invention is directed to telecommunications equipment. More particularly, the present invention is directed to a tool for use with wire connectors for completing connections between a plurality of wires.

BACKGROUND OF THE INVENTION

Tools for use with wire connectors for completing the interconnection of a plurality of wires are necessary for in-field connection of telephone multi-wire cables and other telecommunications wires and multi-wire cables. In practice, a connector is placed in a wire connecting tool which is specifically designed for the particular type of connector, and the desired pairs of wires are aligned with the connector. After all the desired pairs of wires which are to be joined are aligned with the connector, the tool is then operated in order to complete the splicing of the pairs of wires using the tool and the connector. Once completed, the connector is simply removed from the tool and the pairs of wires are thus joined.

In the field of telecommunications, there are several standard wire connectors which are used to join, for example, 20 or 25 pairs of wires together. The first of such standard wire connectors can basically be categorized as a horizontal wire connector while the second type of connector is a vertical wire connector. One of the problems which has been associated with the use of these connectors is the need for a separate tool for each type of connector. Thus, a technician entering the field is oftentimes required to bring one tool for use with a horizontal connector and a separate tool for use in joining the vertical connectors.

Prior art tools for use in joining pairs of wires using the horizontal and vertical connectors are bulky, clamp-like devices which are heavy, complicated in construction, and suited for use with only one of the two identified types of connectors. These heavy and cumbersome tools, which are used on a daily basis by field technicians, oftentimes must be carried for long distances to awkward locations.

More specifically, prior art tools for joining horizontal wire connectors generally use a hydraulic mechanism to create the necessary pressing force for completing the connection between the two pieces of the horizontal wire connector. One problem associated with hydraulically operated devices is that such tools tend to be heavy and cumbersome. This increases the difficulty associated with using such devices in the field.

Prior art tools for joining vertical wire connectors generally include a cam mechanism disposed therein. The cam mechanism controls the range of movement of a T-bar assembly which travels downward in a clamping motion over a wire connector inserted into the tool. Since the typical wire connector is several inches long, it is necessary to apply even pressure along the length of the connector when making the splice.

However, the tools used to complete the splice with the connectors are often carried in the field and are subject to wear and tear associated with constant movement in a truck or being carried into the field by the technician. As a result, the cam mechanism often becomes misaligned, thereby providing unequal pressure between the T-bar assembly and the connector. Thus, more pressure may be applied at one end of the connector during the splicing operation than at the other end. This may result in inadequate splices or completely missed splices between various ones of the wire pairs. Accordingly, the cam mechanism must be adjusted by the technician in the field.

The operation for adjusting the cam mechanism in the typical prior art device basically requires the technician to disassemble the majority of the inner workings of the tool in order to complete the adjustment of the cam mechanism. This is a time-consuming and complicated process which takes up a large amount of the technician's time.

A further problem relates to the incompatibility of the tools for other than the single connector type for which they are designed. If the technician is utilizing both the horizontal and vertical wire connectors at a single job site, the technician may be required to carry two tools to a job site and complete adjustments for both tools, thus wasting a large amount of valuable time.

Accordingly, there is a need for a lightweight, simple, easy-to-use tool for joining wire connectors. There is also a need for reducing the number of components associated with such tools in order to reduce the associated complexity of the instrument thereby improving the tools' reliability. Such a tool must be easy to operate and maintain, and be capable of sustaining extended wear and tear upon being subjected to the rigorous conditions imposed upon field equipment used in the repair and installation of telecommunications and other such equipment.

SUMMARY OF THE INVENTION

The present invention solves the aforementioned problems associated with the prior art by providing a lightweight tool having relatively few parts for use in joining wire connectors. The tool further includes interchangeable components adaptable to the type of wire connector which is being used in a splicing operation. The tool of the present invention can be set up for use with one type of wire connector and, with a minimum amount of effort, can be quickly changed to accommodate a different type of wire connector.

The present invention accomplishes this through the use of a generic tool in combination with removable wire connector holders and force applicators. In a presently preferred embodiment, the generic tool is provided with a set of removable wire connector holders and force applicators adapted for use with the two industry standard connectors (i.e., the horizontal and vertical connectors). With a minimum amount of adjustments, the tool can be quickly altered for use with the particular connector which is being employed at the technician's job site. Other wire connectors could be readily accommodated by the generic tool, however, with a suitably modified connector holder and force applicator.

In accordance with a preferred embodiment of the present invention, the generic tool includes a housing, a base plate adapted to receive a removable wire connector holder, a T-bar which is pivotally connected with the housing, an upper support which is adapted to receive a removable force applicator, and a cam mechanism which is disposed in the housing and which controls a range of vertical movement of the T-bar. Means are provided for removably securing the wire connector holder to the base plate. Means are also provided for removably securing the force-applicator to the upper support at one end of the T-bar.

The removable wire connector holder can be a connector holder for use with a vertical wire connector or a connector holder for use with a horizontal wire connector. Both wire connector holders can be sized to fit both 20 and 25 pair wire connectors, or connectors adapted for a greater or lesser number of wire pairs.

The force applicator can include a simple pressing member which is utilized with horizontal wire connectors, or can include a presser-cutter which is typically used with vertical wire connectors. The presser-cutter applies force along the length of the connector and additionally provides a cutting edge in order to cut excess wire which extends from the connector.

The tool for assembling wire connectors in accordance with the present invention has the majority of its components, including the housing, base plate and T-bar assembly, as well as the various components which make up the cam mechanism, made from a die-cast aluminum which provides a substantial savings in weight without sacrificing the required structural rigidity. Furthermore, the cost for manufacturing is reduced and the die cast aluminum provides substantial durability.

By manufacturing the components using die-cast aluminum, a substantial number of components have been eliminated in the present invention as compared with prior art tools. The present invention has one-third the number of components as compared with a typical prior art tool for joining wire connectors. In addition to easing the operation of the tool and increasing the reliability, the reduced number of components assists in reducing the weight of the tool.

The tool of the present invention is lightweight, has increased reliability due to the fewer components and is capable of accommodating both industry standard type wire connectors as well as multiple size wire connectors and has high durability.

These and other advantages of the present invention will become more apparent upon a reading of the detailed description of the preferred embodiment taken in conjunction with the drawings. However, it should be understood that the present invention is in no way limited to the preferred embodiment shown in the drawings which is merely illustrative of the present invention.

BRIEF DESCRIPTION OF THE DRAWINGS

In the following description of the preferred embodiment, reference is made to the FIGURES where like reference numbers refer to like components.

DETAILED DESCRIPTION OF THE PREFERRED EMBODIMENT

Figure 1:
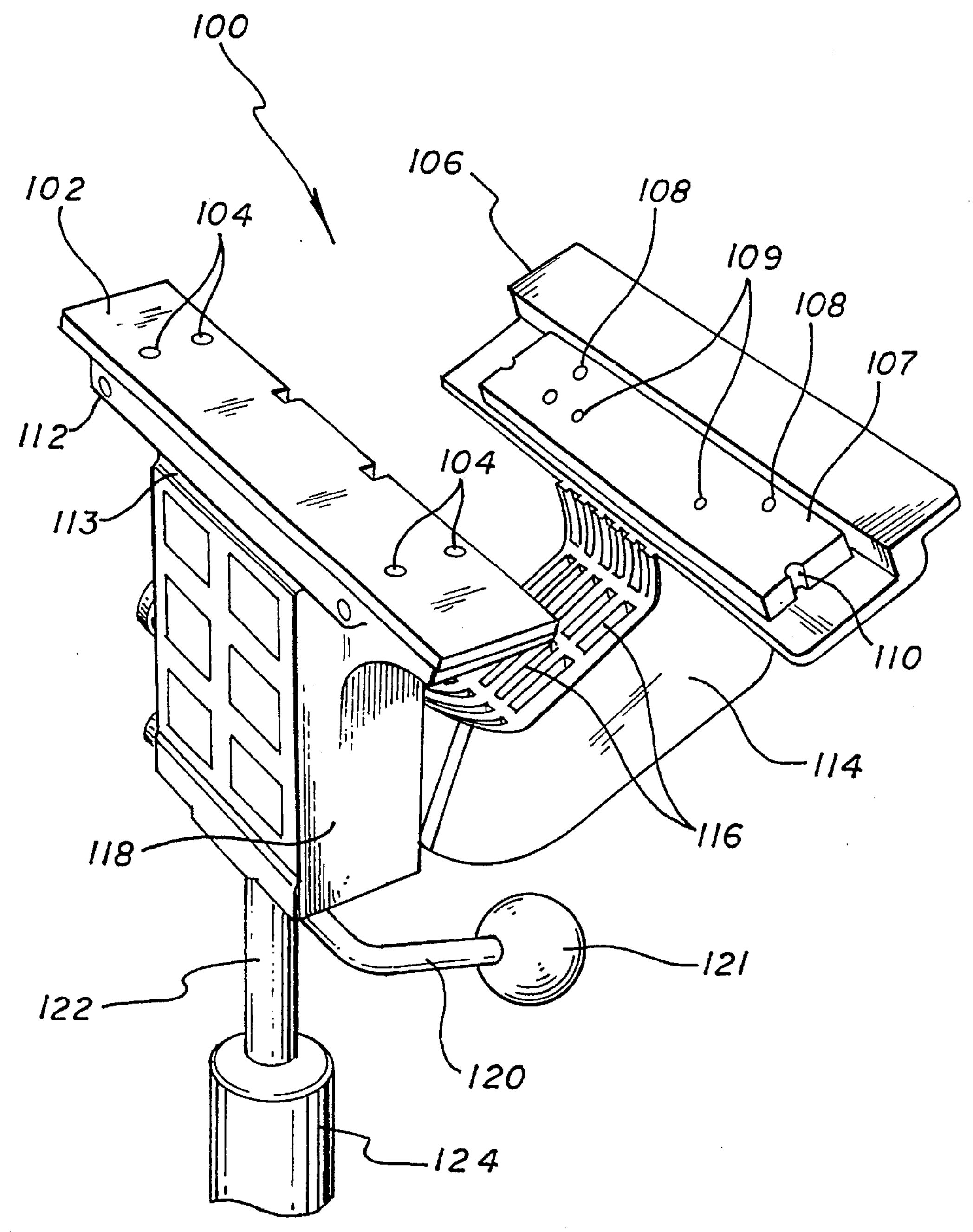
FIG. 1 is a perspective view of a tool for joining wire connectors in accordance with one embodiment of the present invention.

Referring to FIG. 1, a basic tool 100 for joining wire connectors in accordance with the present invention is shown. The tool includes a base plate 102 adapted to receive a removable wire connector holder. The base plate 102 is provided with holes 104 for receiving retaining screws which secure the removable wire connector holders to the base plate 102. An upper support 106 is adapted to receive a removable force applicator. The upper support 106 includes a support block 107 which may be formed integral with the upper support 106. The support block 107 is provided with screw holes 108 which are provided to receive retaining screws which secure the removable force applicator to the upper support 106. Screw holes 109 and 110 may be used to retain cutter assembly 226 discussed in more detail below.

A removable, adjustable cable guide (shown in more detail in FIGS. 9 and 10) is attached to the tool 100 via screw holes 112. The cable guide rests in a ridge or channel 113 which is provided below the base plate 102.

The upper support 106 is disposed at one end of a T-bar 114 which is arcuately shaped and which is pivotally connected with a cam mechanism disposed in a housing 118 below the base plate 102. The T-bar is preferably formed of die-cast aluminum and is provided with a plurality of rib supports 116 to increase the strength thereof while decreasing the overall weight of the tool 100. A force applicator lever 120 which is pivotally connected with the cam mechanism disposed in the housing 118 is provided to allow an operator of the tool to apply the necessary force for completing a wire connector assembly. The force applicator lever 120 is provided with a lever knob 121 to ease the operation of the device. A support rod 122 which can be inserted into a tool stand 124 is provided to support the tool 100 in an upright position.

Figure 2:
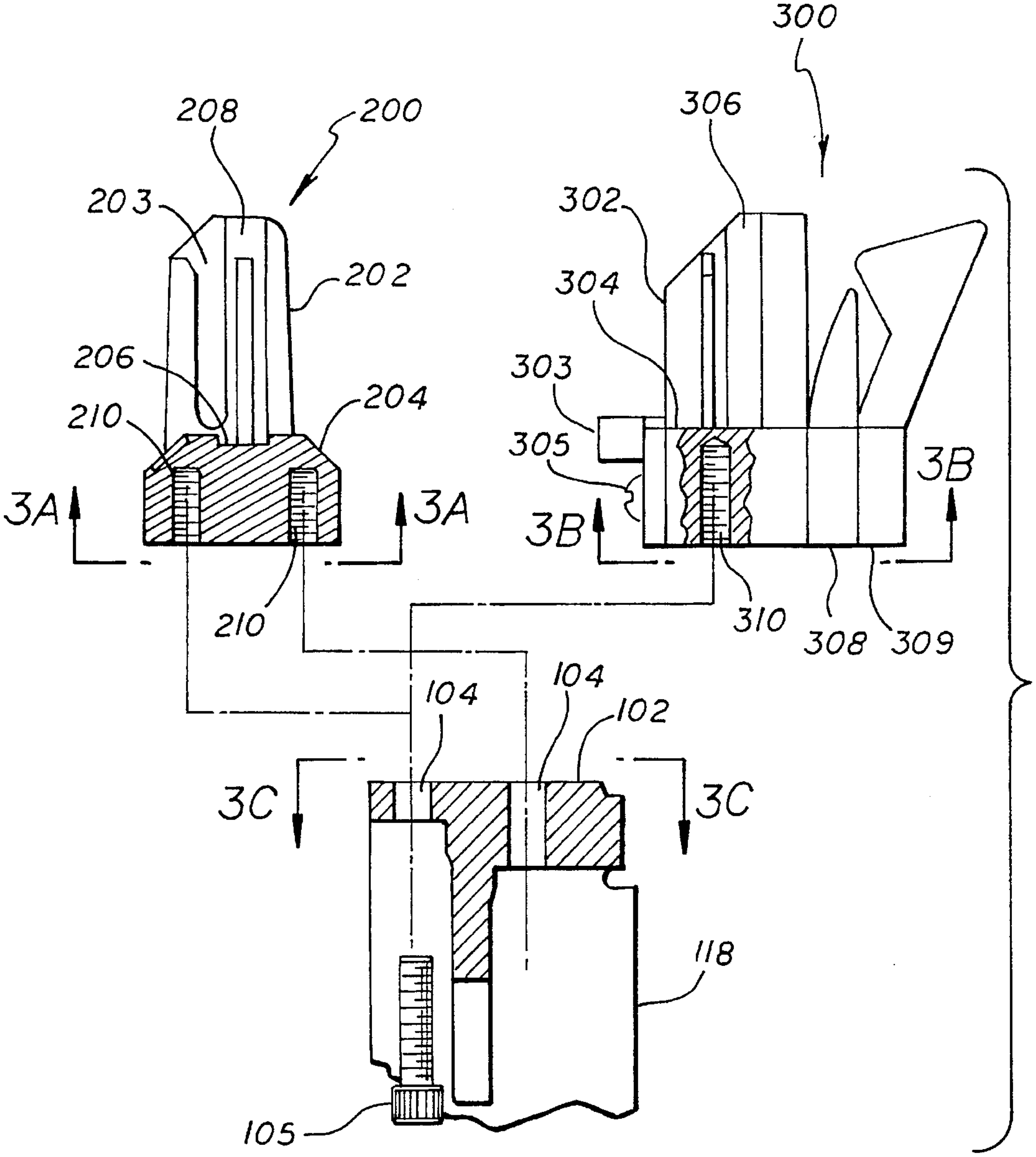
FIG. 2 is a cutaway side view of base plate of the tool shown in FIG. 1 together with side cutaway views of a horizontal wire connector holder and a vertical wire connector holder.

Turning to FIG. 2, a retaining screw 105 is shown which passes through retaining screw holes 104 to engage with a selected one of the vertical and horizontal wire connector holders 200, 300, respectively. The removable vertical wire connector holder 200, which is shown in cutaway form, includes a pair of lateral side rails 202 having a pair of guide slots 203 formed therein. A base portion 204 is provided for supporting a wire connector thereon. A wire connector would be inserted in slot 206 formed in the base portion and for stability purposes may extend into slot 208 provided in the lateral side rails 202. Retaining screw holes 210 are provided for receiving retaining screws 105 which are inserted through the base plate 102 to removably secure the wire connector holder to the base plate. An example of a vertical wire connector can be seen in U.S. Pat. No. 4,307,505, issued Dec. 29, 1981, which is incorporated herein by reference.

The horizontal wire connector holder 300 includes a pair of lateral side rails 302 which extend upward from a base portion 304. An example of a horizontal wire connector can be seen in U.S. Pat. No. 3,708,779 issued Jan. 2, 1973, which is incorporated herein by reference. The lateral side rails 302 are provided with slots 306 formed therein. The slots 306 serve to guide the removable force applicator in vertical movement with the wire connector holder 300 and also serve to receive a portion of the wire connector to stabilize the wire connector as it is supported by the base portion 304. The horizontal wire connector holder 300 is provided with wire guides 308 and 309 to hold and separate wires which are being joined with a horizontal wire connector. A one-piece multigauge wire holder 303 is mounted to the base portion 304 using mounting screws 305 which pass through mounting screw holes 307. The wire holder 303 maintains individual wires in place during assembly. Retaining screw holes 310 are provided in the base portion 304 to receive retaining screws 105 which are inserted through the base plate 102 to removably secure the horizontal wire connector holder 300 to the base plate.

Figures 3A, 3B, 3C:
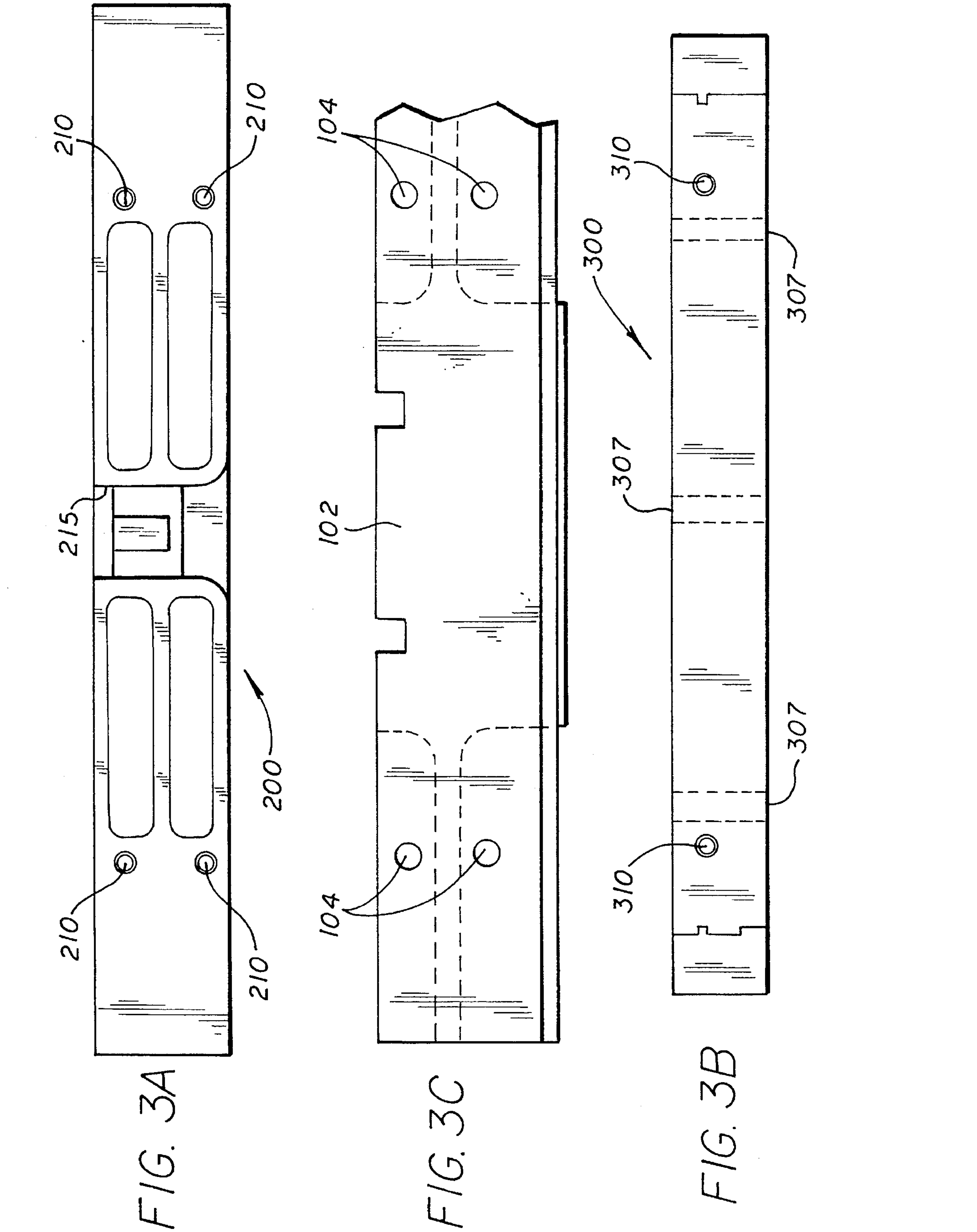
FIG. 3 shows three views taken along the lines A—A, B—B and X—X of FIG. 2.

FIG. 3 shows views taken along the lines A—A, B—B and X—X of FIG. 2. These views show the alignment of the screw holes 104 provided in the base plate 102 with the retaining screw holes 210 and 310 provided in the vertical wire connector holder 200 and the horizontal wire connector holder 300. In addition, it is seen that the vertical wire connector holder 200 is provided with a channel 215 formed in a bottom surface thereof which is provided for a connector retainer shown in more detail in FIGS. 7 and 14. The channel allows the connector retainer to move laterally relative to the vertical wire connector holder 200 when the connector holder 200 is removably secured to the base plate 102.

Figure 4:
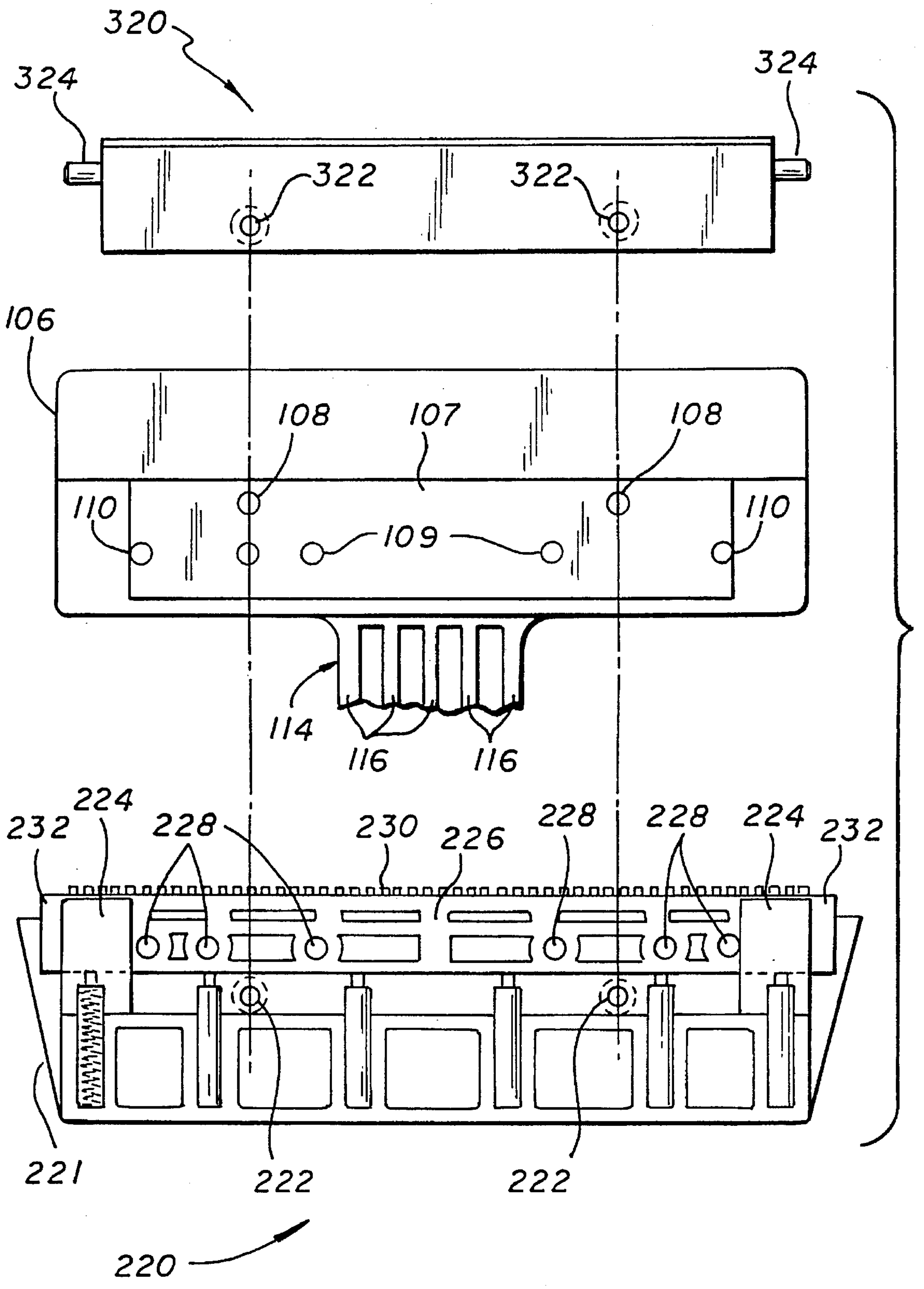
FIG. 4 is a top view of an upper support for the tool shown in FIG. 1 and bottom views of force applicators used with the horizontal and vertical wire connector holders.

FIG. 4 shows the force applicators 220 and 320 for use with the vertical wire connector holder 200 and the horizontal wire connector holder 300 relative to the upper support 106 disposed at one end of the T-bar 114. The force applicator 220 for use with the vertical wire connector holder 200 is essentially a presser-cutter having a face plate 221, retaining screw holes 222, pressing members 224 and a cutter assembly 226. The cutter assembly, the body of which may be made of plastic or other suitable material, is provided with retaining screw holes 228 for securing the cutter assembly 226 to the face plate 221. Cutting teeth 230, which may be made of steel or other suitable cutting material, are provided for cutting wires during the assembly of a vertical wire connector. A pair of lateral side rails 232 engage with the pair of guide slots 203 formed in the lateral side rails 202 of the vertical wire connector holder 200 to control relative vertical movement of the force applicator 220 as a vertical wire connector is being assembled.

The force applicator 320 for use with a horizontal wire connector holder 300 essentially comprises a solid, block-like pressing member 320 including retaining screw holes 322 and guide rods 324 which engage the guide slots 306 formed in the lateral side rails 302 of the horizontal wire connector holder 300. Like the side rails 232, the guide rods 324 control the relative vertical movement of the force applicator 320 as a horizontal wire connector is being assembled.

The retaining screw holes 222 and 322 formed in the force applicators 220 and 320 respectively, are formed so as to align with the retaining screw holes 108 which are formed in the support block 107 of the upper support 106. A retaining screw (not shown) is inserted through the retaining screw holes 222 and 322 to engage the respective retaining screw holes 108 to removably retain the force applicators 220 and 320 on the upper support 106. In addition, the rib structure 116 of the T-bar 114 includes a plurality of ribs 116 which provide additional strength for the T-bar 114.

Figure 5:
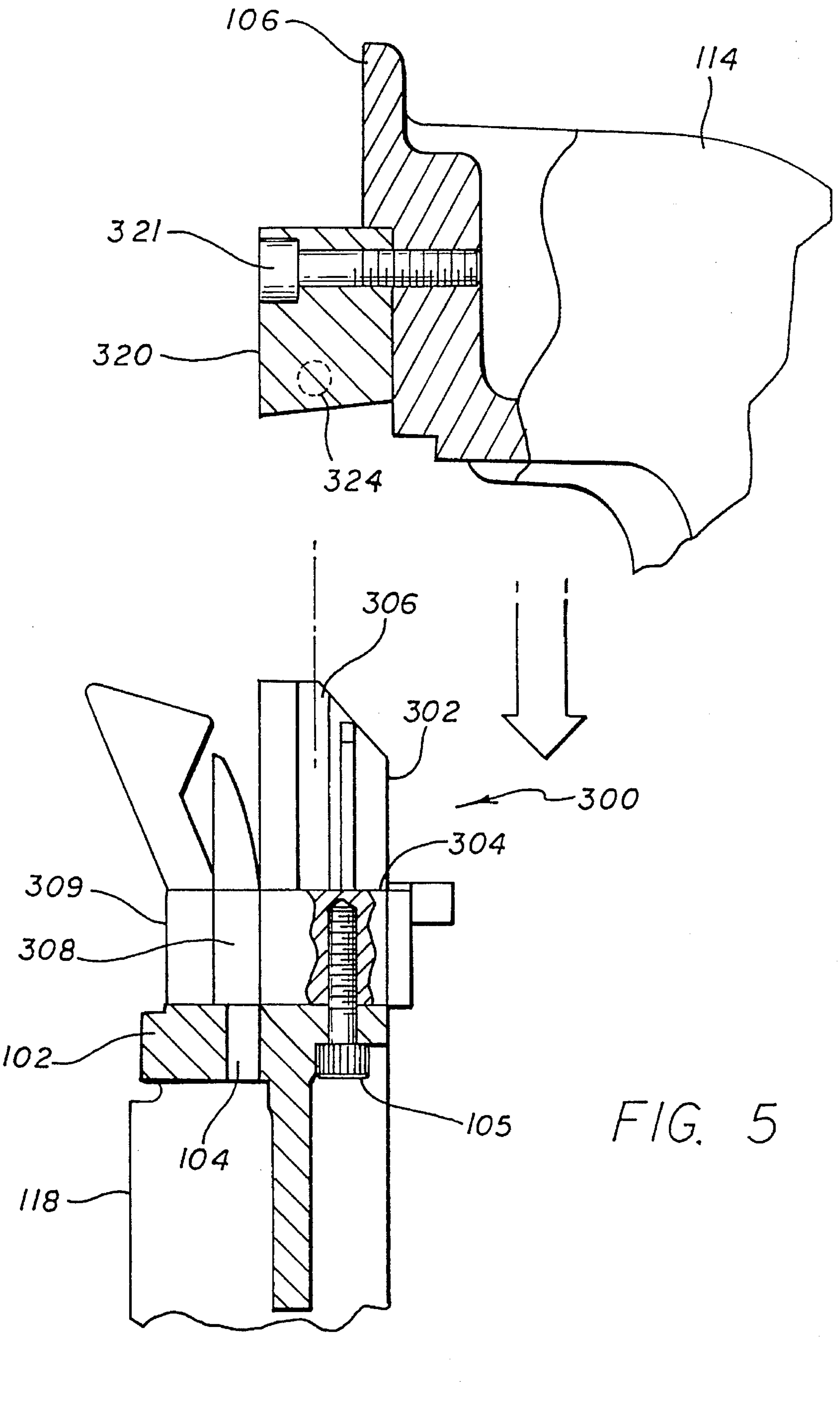
FIG. 5 is a cutaway side view showing the operation of the tool of FIG. 1 with a horizontal wire connector holder and force applicator installed thereon.
Figure 6:
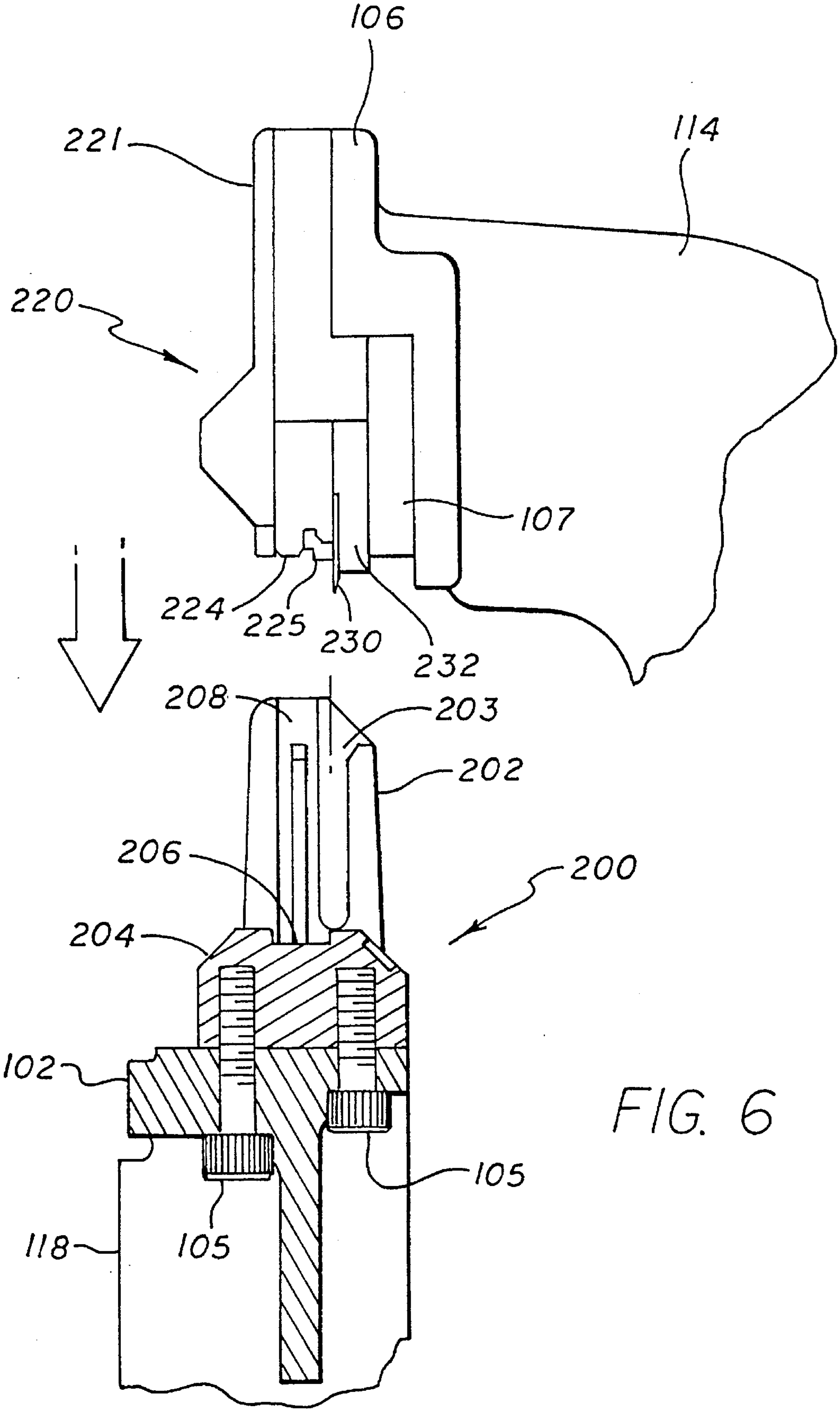
FIG. 6 is a cutaway side view showing operation of the tool of FIG. 1 with a vertical wire connector holder and force applicator.

FIGS. 5 and 6 serve to illustrate the relative motion of the upper support 106 with the force applicators 220 and 320 installed thereon with respect to the base plate 102 having the wire connector holders 200 and 300, respectively, installed thereon. Referring in particular to FIG. 5, it is seen that the T-bar 114, which as mentioned previously is pivotally connected with a cam disposed in the housing 118, is also capable of vertical movement relative to the base plate 102.

With the horizontal wire connector holder 300 installed on the base plate 102 and the removable force applicator 320 secured to the upper support 106, the T-bar 114 is moved through an arcuate motion until the force applicator 320 is positioned directly above the wire connector holder 300. T-bar assembly 114 is then slid in a downward fashion so that guide pins 325 on opposite side ends of the force applicator 320 engage the slots 306 in the lateral slide rails 302 of the wire connector holder 300. Force applicator 320 then compresses the wire connector which would be installed on the base portion 304 between the lateral side rails 302 with a force sufficient to complete the wire connector assembly.

Referring to FIG. 6, the vertical wire connector holder 200 is installed by retaining screws 105 on the base plate 102. The presser-cutter 220 is installed on the upper support 106 and the T-bar 114 is moved through an arcuate path until the force applicator 220 is positioned directly above the vertical wire connector holder 200 installed on the base plate 102. Then the T-bar assembly 114 is slid in a downward fashion so that the lateral side guides 232 engage the slots 203 formed in the lateral side rails 202 which extend upwardly from the base portion 204. As the pressing members 224 press portions of the wire connector together, a contact tooth 225 pushes wires into the wire connector assembly and the cutting teeth 230 cut any excess wire extending out of the wire connector.

Figure 7:
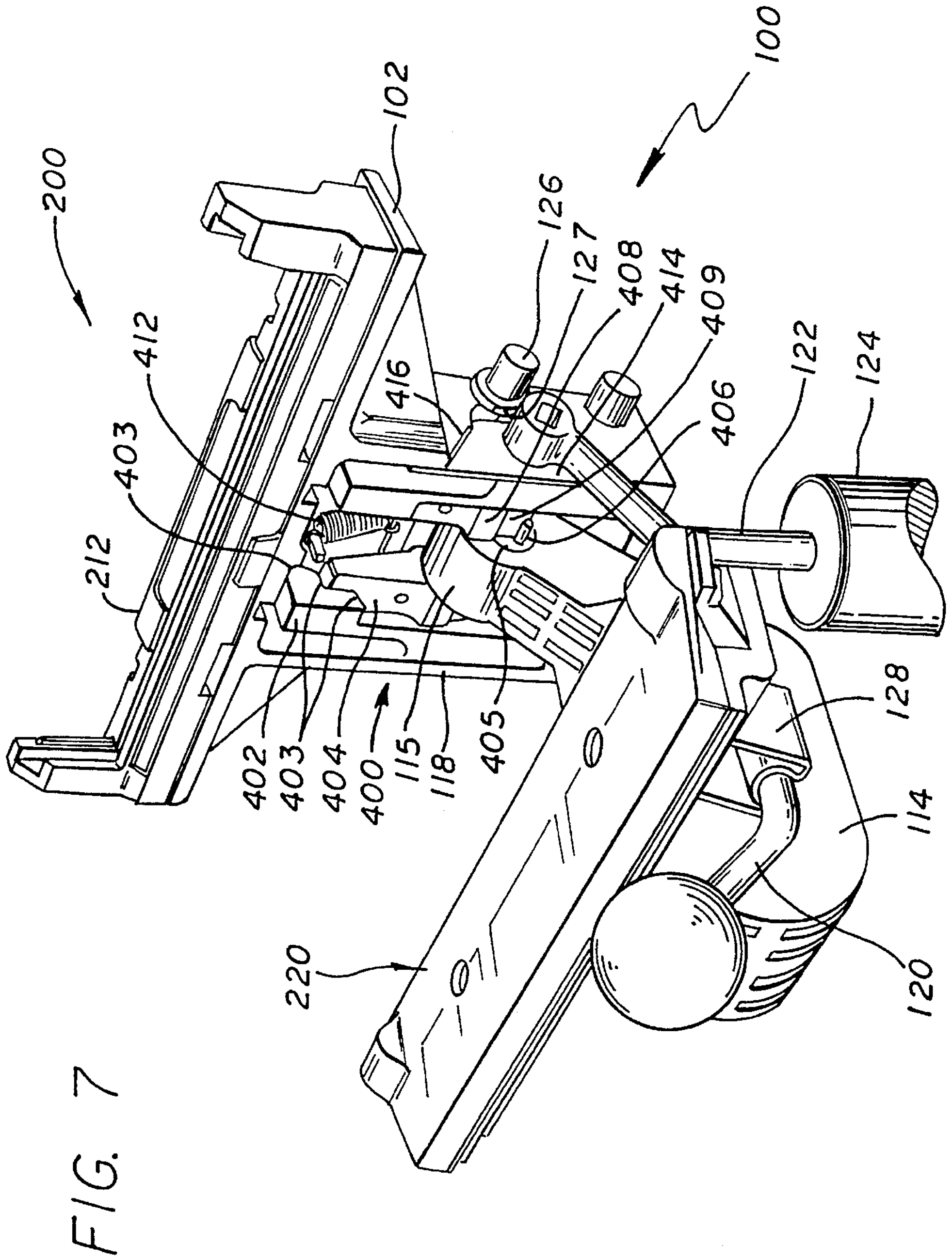
FIG. 7 is a perspective view of the tool shown in FIG. 1 with a vertical wire connector holder and force applicator installed thereon.

FIG. 7 shows the details of the cam mechanism 400 of the tool shown in FIG. 1. The T-bar 114 pivotally connects with the cam mechanism 400. The T-bar 114 has a rounded portion 115 at the pivot connection. With the tool 100 in an open state as shown in FIG. 7, the force applicator lever 120 is secured via a lever arm clamp 128 which is attached to a rear portion of the upper support 106.

The cam mechanism 400 includes a stop member 402 having a plurality of steps 403 formed thereon. The plurality of steps, preferably three, provide for a corresponding number of incremental movements of the upper support 106 relative to the base plate 102. A pair of finger members 404 engage the various steps 403 on the stop member 402. The mating of the finger members 404 with the steps 403 control the amount of pressure which will be applied by the force applicator 220 against the vertical wire connector holder 200. By changing the position of the finger member 404 relative to one of the steps 403, the amount of downward movement of the upper support 106 relative to the base plate 102 can be controlled, thereby limiting the extent of vertical travel of the T-bar 114 and the corresponding force applied by the upper support 106 against the base plate 102.

A rod 406 extends from a support cylinder 405 which passes through the curved portion 115 of the T-bar of 114 and slidably abuts a curved portion 409 of the finger members 404. A first rod limiter 408 comprises an upraised portion on the finger member 404 and limits the extent of pivotal movement of the T-bar 114 relative to the cam mechanism 400.

The support cylinder 405 has a portion which extends through the stop member 402 and extends into and is secured to the force applicator lever 120. Rotation of the force applicator lever 120 causes the cylinder 405 to rotate. As the cylinder 405 rotates, the guide rod 406 travels about the curved surface 409 of the finger member 404 causing displacement of the T-bar 114 in accordance with the curved surface 409 of the finger member 404. A spring 412 is used to bias the finger members 404 against the stop members 402. When the T-bar 114 is lifted to an upright position over the base plate 102, the guide rod 406 abuts the rod limiter 408 and force the finger members 404 to overcome the force of the spring 412 and disengage from the steps 403 on the stop member 402. This allows the maximum vertical displacement of the T-bar 114.

A channel 116 is cut in the housing 118 to allow the vertical movement of the T-bar 114. A metal shim 414 is disposed between the stop member 402 and the force applicator lever 120 to prevent dirt or other materials from entering the housing 118. The shim is held in place by the secure arrangement between the force applicator lever 120 and the support cylinder 405. The channel 416 allows a limited amount of vertical displacement of the finger members 404 and T-bar assembly 114 relative to the housing 118.

To prevent vertical movement of the T-bar 114 and finger members 404, a T-bar securing knob 126 is provided. The T-bar securing knob 126 abuts the channel 416 formed in the housing 118 and has a flat portion 127 which abuts the channel 416. The T-bar securing knob 126 is capable of turning when not adjacent the force applicator lever 120. Thus, with the force applicator lever 120 either in the uppermost or lowermost position relative to the channel 416, the T-bar securing knob 126 can be rotated thus eliminating the vertical movement of the force applicator lever 120 and thus the T-bar 114.

Figure 8:
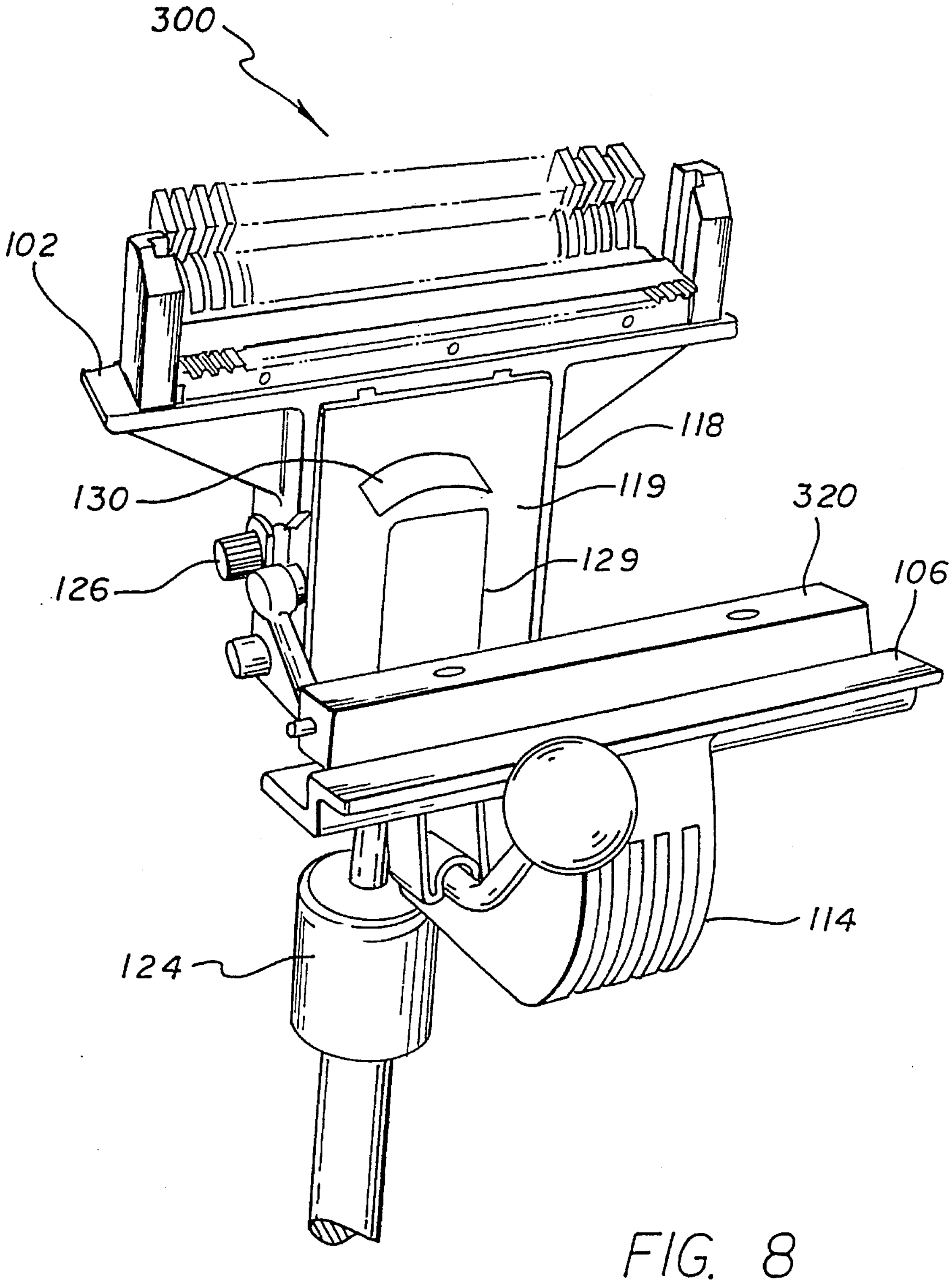
FIG. 8 is a perspective view of the tool shown in FIG. 1 with a horizontal wire connector holder and force applicator installed thereon.

FIG. 8 shows the horizontal wire connector holder 300 installed on the base plate 102 and the force applicator 320 installed on the upper support 106. In FIG. 8, the housing 118 is provided with a housing cover 119 which is normally installed over the opening in the housing 118 to prevent dust and other particles from entering into and interfering with the operation of the cam mechanism 400. The cover 119 is provided with a slot 129 which accommodates the vertical movement of the T-bar 114 as seen in more detail in FIG. 17. A hood 130 is provided over the slot 129 to prevent wires from the wire connectors from becoming tangled in the slot 129 and the cam mechanism 400.

Figure 9:
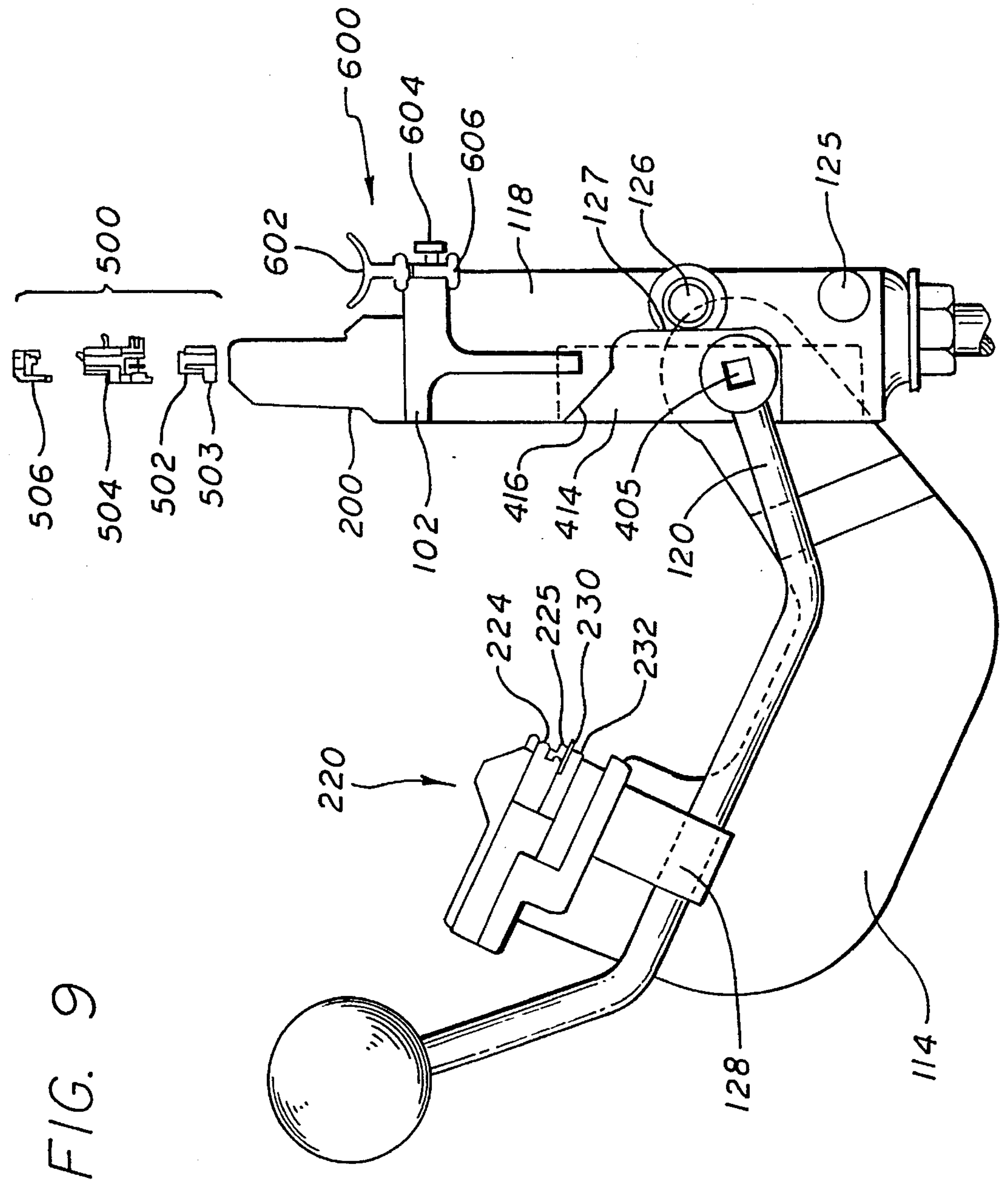
FIG. 9 is a side view of the tool shown in FIG. 1 with a vertical wire connector holder and force applicator installed thereon together with an exploded view of a vertical wire connector.

FIG. 9 shows the tool of FIG. 1 with a vertical wire connector holder 200 installed on the base plate thereof. Reference numeral 500 refers to a vertical wire connector having a bottom piece 502 which includes a protruding edge 503. A middle piece 504 and a top piece 506 complete the vertical connector. A cable guide 600 is shown having a Y-shaped cable trough 602. The cable guide 600 is removably retained against the base plate 102 via a retaining screw 604 which mates with screw holes 112 shown in FIG. 1. A support appendage 606 rides in channel 113 also shown in FIG. 1.

FIG. 9 also provides a view showing the channel 416 formed in the outer surface of the housing 118 which allows for the vertical movement of the T-bar assembly 114. The metal shim 414 is sized so as to cover the channel 416 at the top and bottom portions thereof throughout the range of vertical motion of the T-bar assembly 114. A stopper 125 is provided to limit the downward movement of the force applicator lever 120 should it become disengaged from the clamp 128. The metal shim 414 simply rides on the support cylinder 405 to prevent dirt from entering the housing 118. When the cover 119 is placed over the opening formed in the housing 118, the shim 414 abuts the cover 119 and is maintained in substantially vertical alignment with the housing 118.

Figure 10:
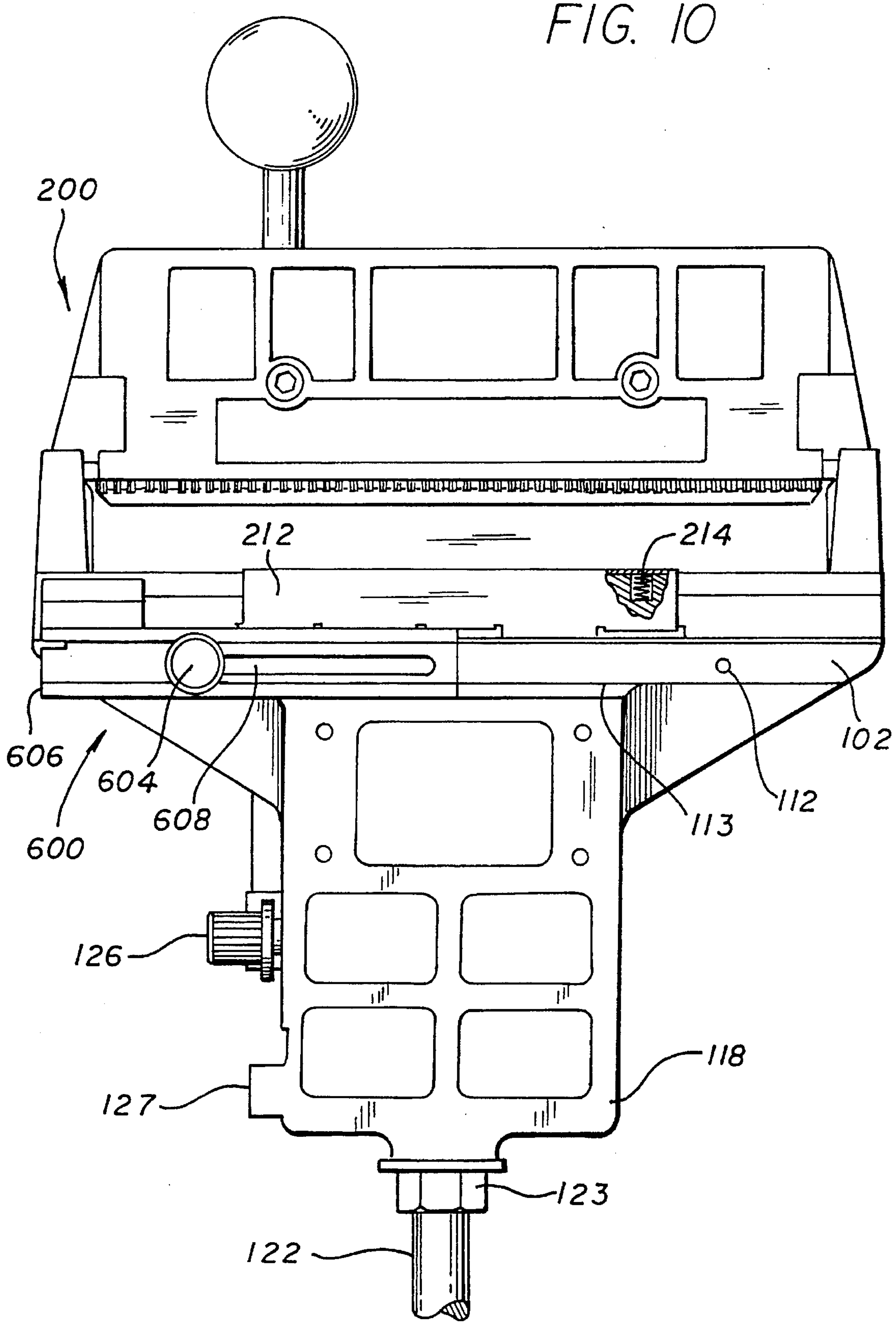
FIG. 10 is a rear view of the tool shown in FIG. 1 with a vertical wire connector and force applicator installed thereon.

FIG. 10 demonstrates the adjustable nature of the cable guide 600. In particular, the retaining screw 604 mates with the screw holes 112 provided in the base plate 102 and can be loosened to allow the cable guide 600 to be slide laterally along the base plate 102 with the appendage 606 resting in the group 113. The range of motion is limited by a opening 608 formed in the cable guide 600. The cable guide 600 can be formed of plastic or other suitable material and can be mounted on the left side as shown in FIG. 10 or on the right side through the hole 112 shown in FIG. 10.

The cable guide 600 can be provided with an opening below the Y-shaped trough 602 or in another suitable location to accommodate a wire retaining member. A wire retaining member may comprise a nylon or similar strap with a velcro fastener disposed thereon or an elastic cord for retaining the wire in the trough while it is be worked on using the tool of the present invention. As some technicians prefer the velcro fastener to the elastic cord, the present invention is adaptable for use with the wire retaining member most preferred by the particular technician using the tool.

Spring 214 is shown disposed in the vertical wire connector holder 200 below a wire connector retainer 212. The wire connector retainer 212 will be discussed in more detail below with respective FIGS. 14–16.

The tool 100 may be mounted on the support rod 122 via a nut or bolt 123. In this embodiment, the housing 118 would be provided with a threaded portion which would mate with a corresponding threaded portion of the nut or bolt 123 and allow the tool 100 to be securely seated on the support rod 122.

Figure 11:
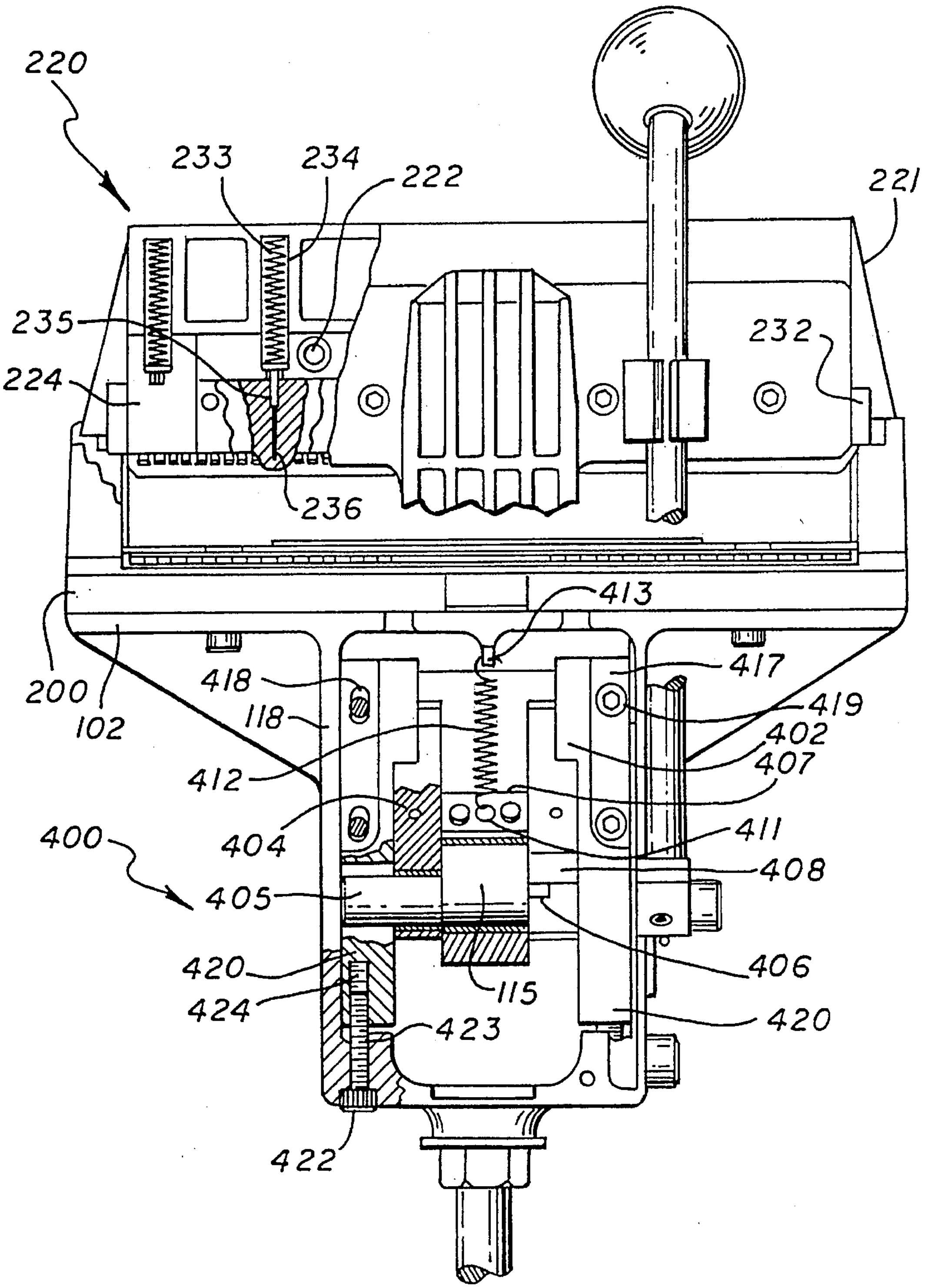
FIG. 11 is a front view of the tool shown in FIG. 1 with a vertical wire connector and force applicator installed thereon together with cutaways showing details of a cam mechanism and the force applicator for use with the vertical wire connector holder.

FIG. 11 shows additional details of the force applicator 220 for use with a vertical wire connector holder 200. As can be seen, the force applicator 220 is provided with a plurality of springs 233 which are seated in wells 234 which are formed, preferably, during the die-cast process during the manufacture of the force applicator 220. The springs bias piston members 235 having rods 236 attached thereto. The piston and rod configuration is designed to apply a positive bias force against various portions of the connector 500 as it is being assembled. After the application of force via the upper support 106 having the force applicator 220 disposed thereon, without the use of the piston 235 and rod 236, the wire connector has a tendency to cling to the force applicator 220. Using the positive bias force provided by the spring 233, the rod 236 applies enough force against the connector to prevent the connector from clinging to the force applicator 220.

Additionally shown in FIG. 11 is a simplified arrangement for adjusting the cam mechanism 400. By removing the cover 119 from the housing 118, a technician can simply and easily adjust the cam mechanism 400 to apply equal pressure across the entire wire connector disposed in one of the removable holders 200, 300.

More particularly, a crossbar 407 is provided in abutting relation with the finger members 404. The crossbar 407 has a spring connect hole 411 to which is attached one end of the spring 412. The other end of the spring 412 connects to a hook 413 which depends from the base plate 102. The spring 412 provides a positive bias force against the crossbar support for the finger members 404 causing the finger members 404 to urge forward in a perpendicular direction relative to FIG. 11. On either side of the stop members 402, there is provided a flange member 417 which is integrally formed with the stop member 402. The flange members 417 have elongated, oval-shaped screw support holes 418 formed therein to allow for adjustment of the stop members 402 in the vertical direction relative to the housing 118. Each stop member can be individually adjusted up and down relative to the housing 118. In this fashion, the relative positions of the steps 403 formed on the stop members 402 will change relative to the base plate 102. Since the finger members 404 ride on the support cylinder 405, as force is applied with the force applicator 220, the finger members 404 will engage the steps 403 and will automatically adjust the angle of the T-bar upper support 106 depending upon the relative distance between the steps 403 and the base plate 102.

In more detail, to adjust the position of the stop members 402 relative to the housing 118, a field technician would loosen stop member support screws 419 and turn a cam adjust screw 422 which is disposed in a threaded hole 424 provided in the stop members 402. The threads 423 of the screw 422 mate with the threads provided in the threaded hole 424, and, by turning the screw the height of the stop members 402 can be adjusted along a range equal to that defined by the opening 418. Once the proper alignment of the cam mechanism is achieved, the technician would tighten the support screws 419 and the cam mechanism would be adjusted and ready for operation.

Figure 12:
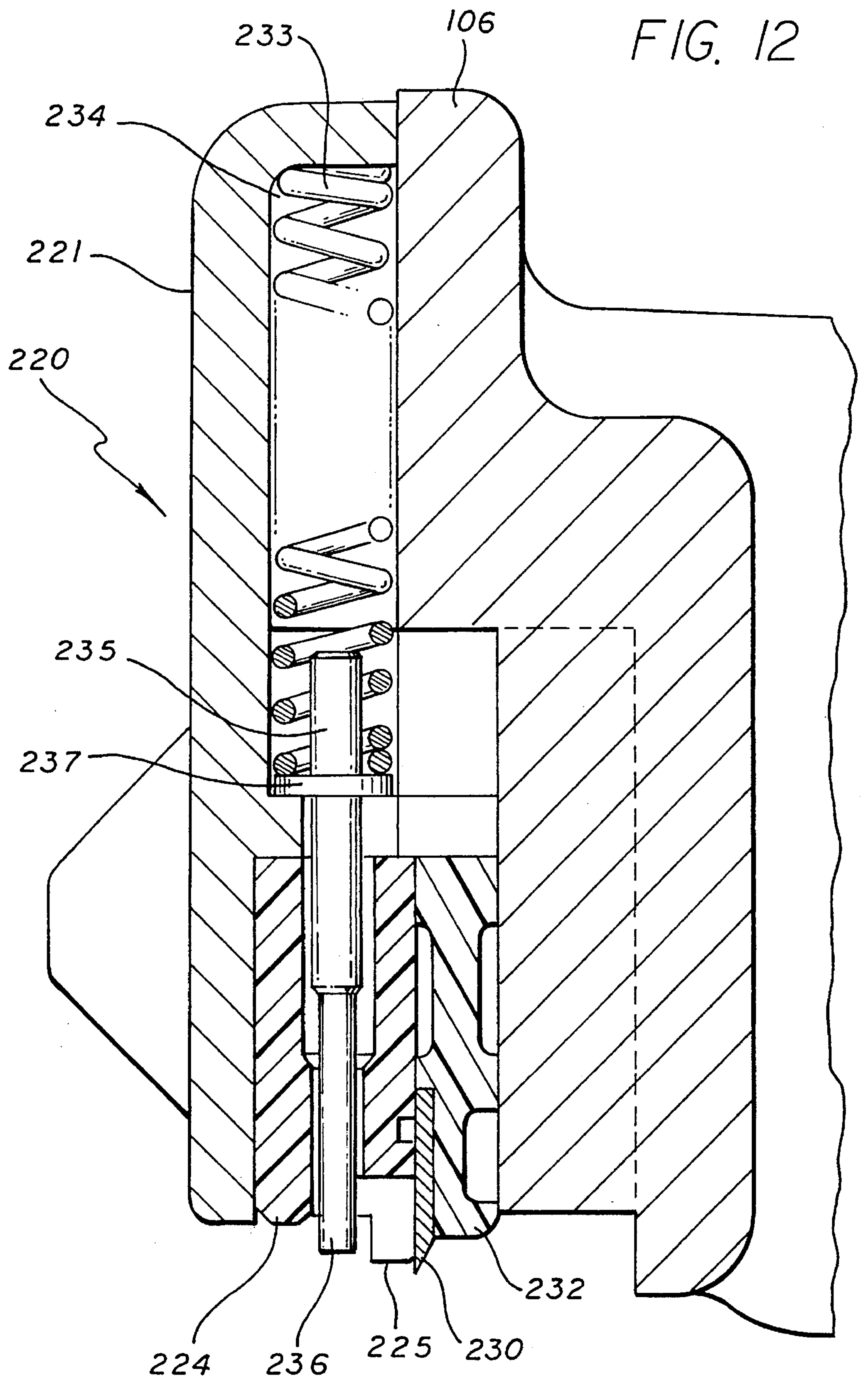
FIG. 12 is a cutaway side view showing the details of the force applicator for use with the vertical wire connector holder installed on the upper support of the tool shown in FIG. 1.

FIG. 12 shows the details of the force applicator 220 for a vertical wire connector holder 200. In particular, as can be seen spring 233 resides in well 234 formed in the face plate 221 of the force applicator 220 and rests upon a spring base support 237. The spring base support 237 is formed integral with the piston member 235 which connects with the rod 236. Thus, as the upper support 106 is moved in a downward fashion as viewed in FIG. 12, when the rod 236 contacts the wire connector disposed in the vertical wire connector holder 200, the rod 236 will force the piston 235 in an upward fashion against the force of the spring 233. When the upper support 106 is moved in an upward direction away from the connector disposed in the vertical connector holder 200, the rod 236 will be biased by the spring 233 to press the connector away from the force applicator 220 and prevent the connector from clinging to the force applicator 220.

Figure 13:
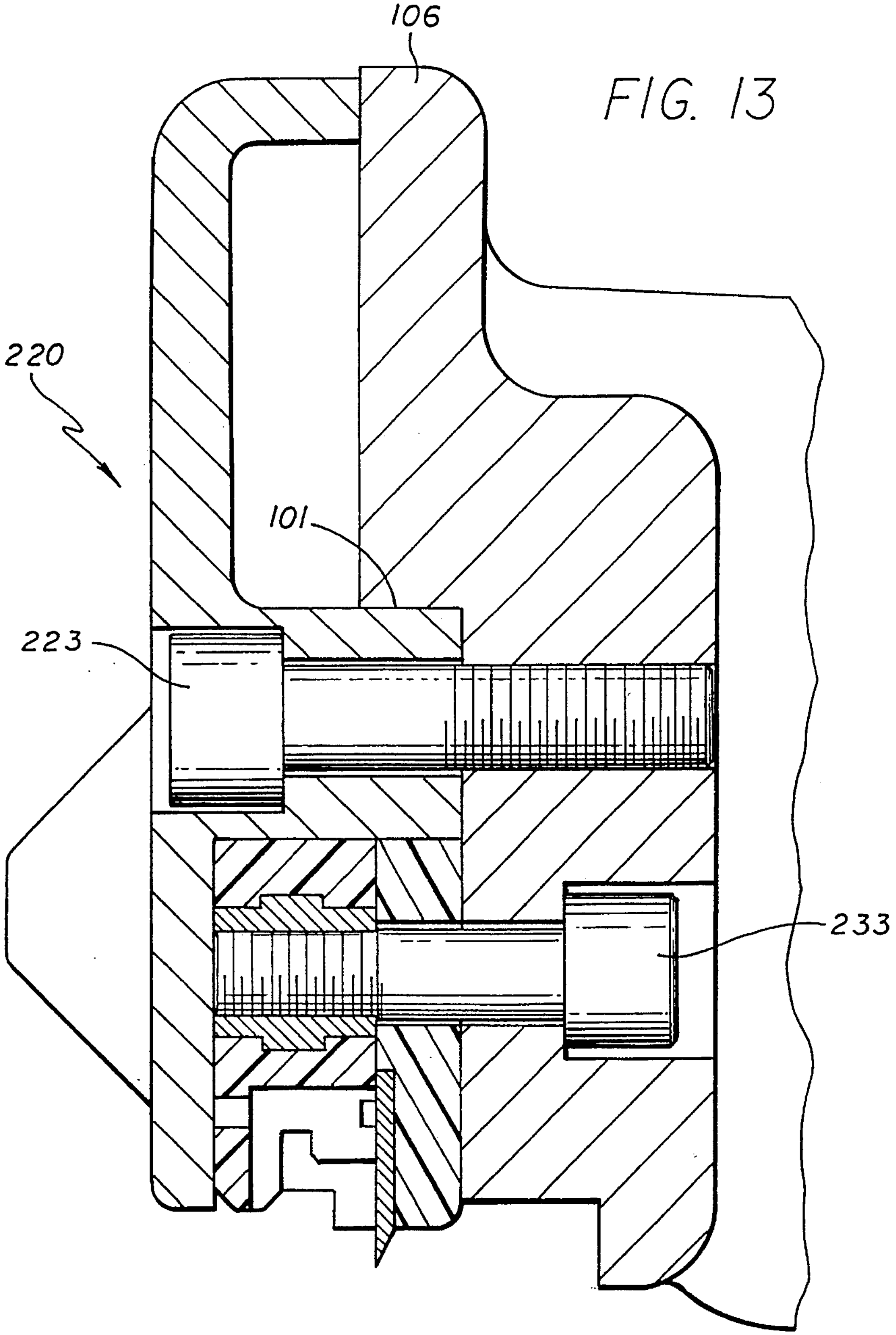
FIG. 13 is a cutaway side view showing interconnections between the force applicator for use for the vertical wire connector holder and the upper support of the tool shown in FIG. 1.

FIG. 13 shows the use of retaining screws 223 to retain the force applicator 220 in position on the upper support 106. In particular, the screws 223 mate with holes 108 and 228 formed in the upper support 106 and the force applicator 220, respectively. Using such screws, the force applicator 223 is maintained in secure position against the upper support 106. To assist in maintaining the position of the force applicator 220, the upper support 106 is provided with a ledge surface 101 which abuts the force applicator 221 when it is properly seated on the upper support 106 and will prevent vertical movement of the force applicator 220 as the force applicator is applied against the base plate 106. The other embodiment of the force applicator, 320, also abuts the ledge 101 and is maintained in secure position as the force applicator 320 is used to apply pressure against a horizontal connector being supported by the horizontal connector holder 300 when it is attached to the base plate 102.

Figure 14:
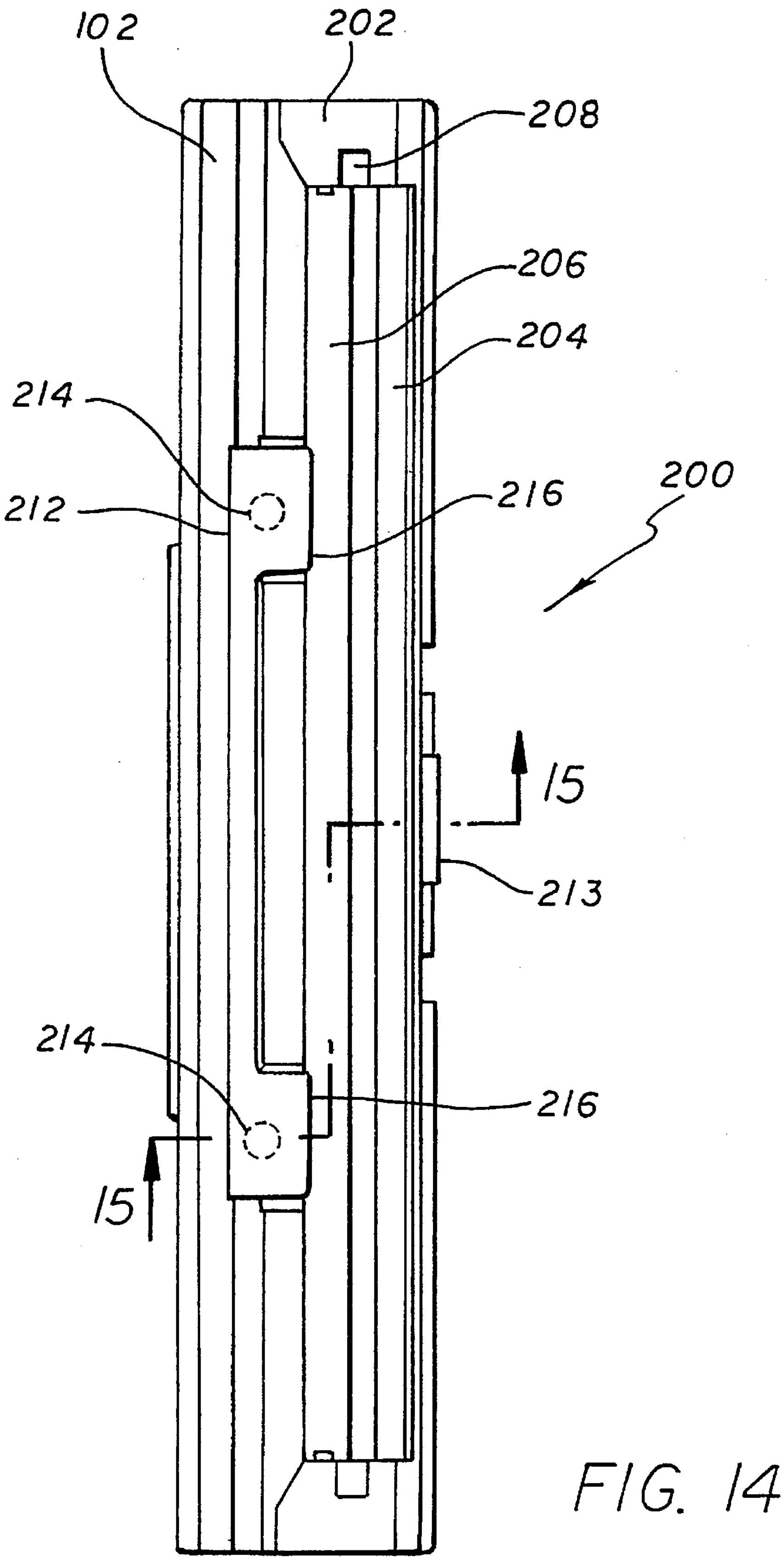
FIG. 14 is a top plan view of a vertical wire connector holder.

FIG. 14 shows a connector retainer 212 disposed on the vertical wire connector holder 200. Springs 214 are positioned below appendages 216 formed in the wire connector retainer 212 and allow for vertical displacement of the connector retainer 212. The wire connector retainer comprises a piece of metal, preferably spring steel, which extends from the appendages 216 around the circumferential surface of the wire connector holder 200 and ends at a release tab 213.

Figure 15:
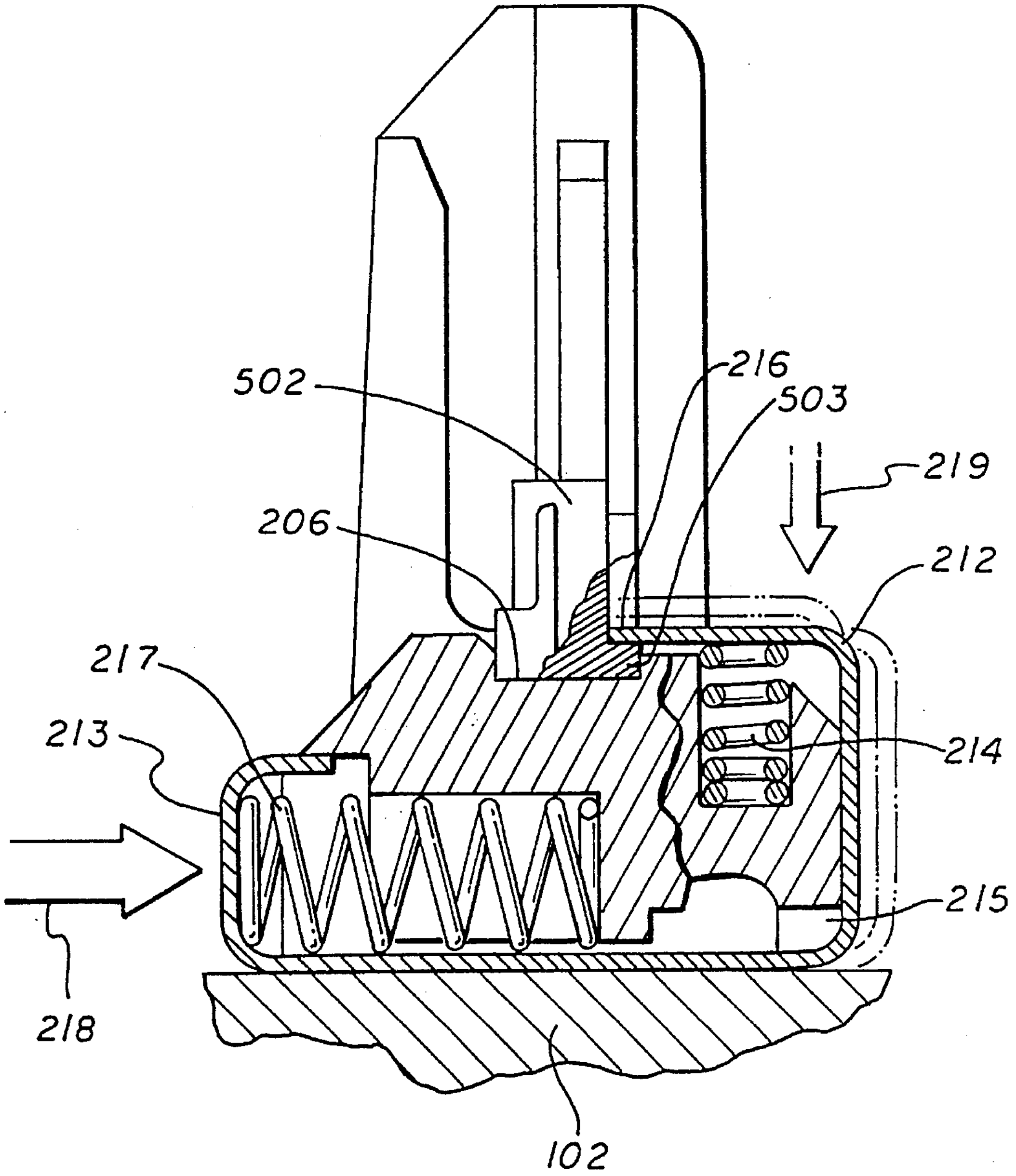
FIG. 15 is a cutaway side view showing the inner details of the vertical wire connector holder.

FIG. 15 shows in detail the wrap around configuration of the connector retainer 212 in the release tab 213. In particular, the connector retainer 212 is sized such that a portion of appendages 216 extend outwardly over the slot 206 formed in the base portion 204 of the connector holder 200. As the release tab 213 is pressed inwardly along the line of directional arrow 218 shown in FIG. 15, the appendages 216 move outward away from the slot 206. A bottom piece 502 of a vertical wire connector 500 would be inserted into the slot 206 and the release tab 213 would then be released allowing the connector retainer 212 to return to the original position with the appendages 216 overhanging the protruding edge 503 of the bottom piece 502, thereby securing the bottom piece 502 in place in the slot 206.

A spring 217 can be provided to cause the connector retainer 212 to be resiliently biased such that the appendages 216 are biased in position over the slot 206. After the connector is assembled, the user simply presses the release tab 213 along the direction of arrow 218 and the appendages 216 will slide laterally away from the slot 206 allowing the connector to be removed. Direction arrow 219 shows the vertical movement of the connector retainer 212 due to the biasing force of spring 214.

Reference numeral 215 shows the channel along the bottom surface of the vertical wire connector holder 200 which allows the connector retainer 212 to pass along the bottom surface of the wire connector holder 200 and maintain the capability of lateral movement even after the wire connector holder 200 is securely installed on the base plate 102.

Figure 16:
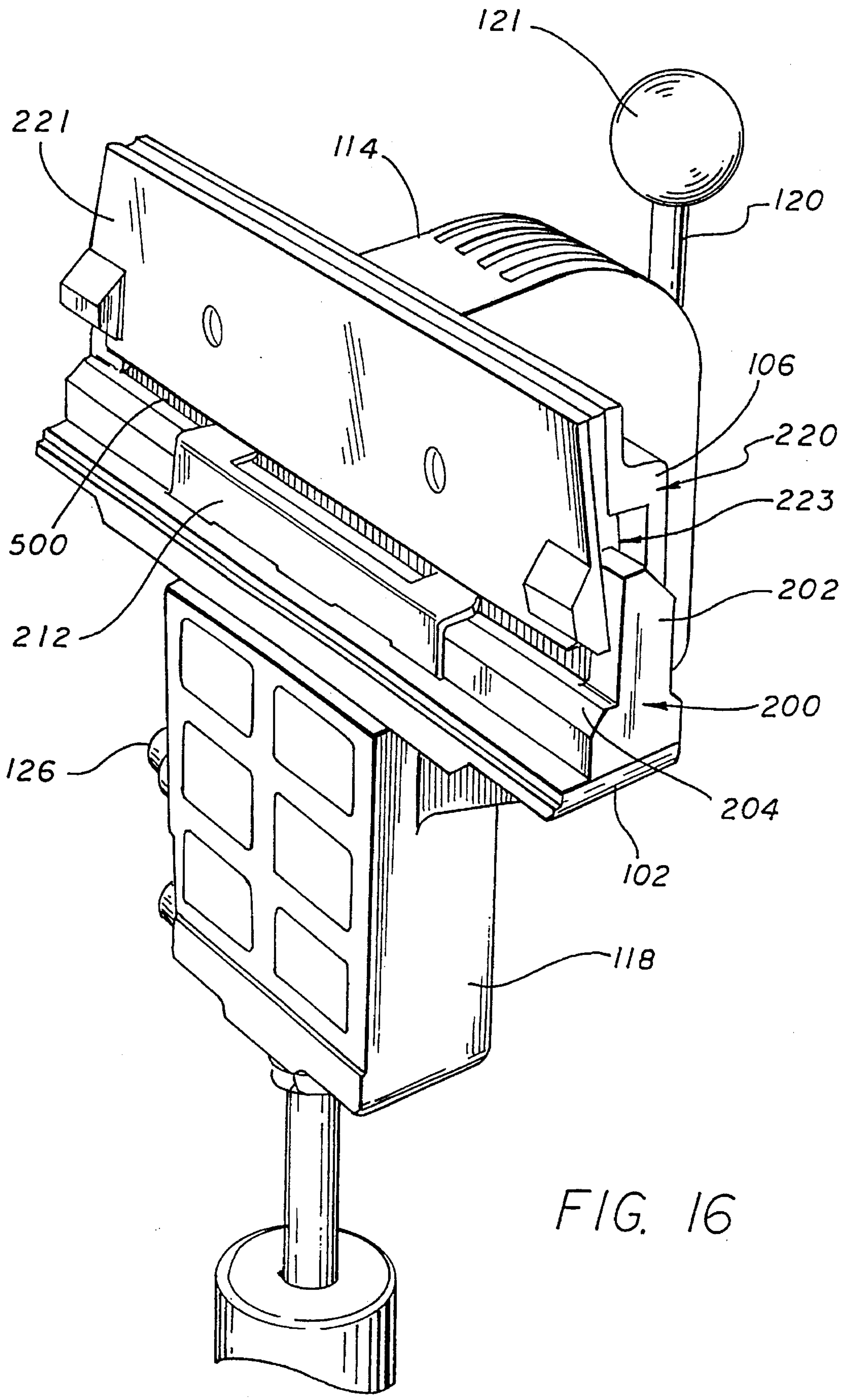
FIG. 16 is a perspective view of the tool shown in FIG. 1 with a vertical wire connector holder and force applicator installed thereon.

As can be seen in FIG. 16, the connector retainer 212 holds a vertical wire connector 500 in place on the connector holder 200 to allow for operation of the T-bar 114 and the application of force via the force applicator 220. FIG. 16 also illustrates the interaction between the upper support 106 having the force applicator 220 installed thereon and the vertical wire connector holder 200. In particular, the face plate 221 of the force applicator 220 is spaced from the upper support 106 when the force applicator 220 is installed on the upper support. The spacing between the face plate 221 and the upper support defines a groove 223 which is of sufficient size to allow the lateral side rails 202 of the vertical connector holder 200 to slidably engage therewith. This helps to control the vertical movement of the upper support 106 and T-bar 114 during the moments immediately preceding application of force to the connector 500 disposed in the connector holder 200.

Figure 17:
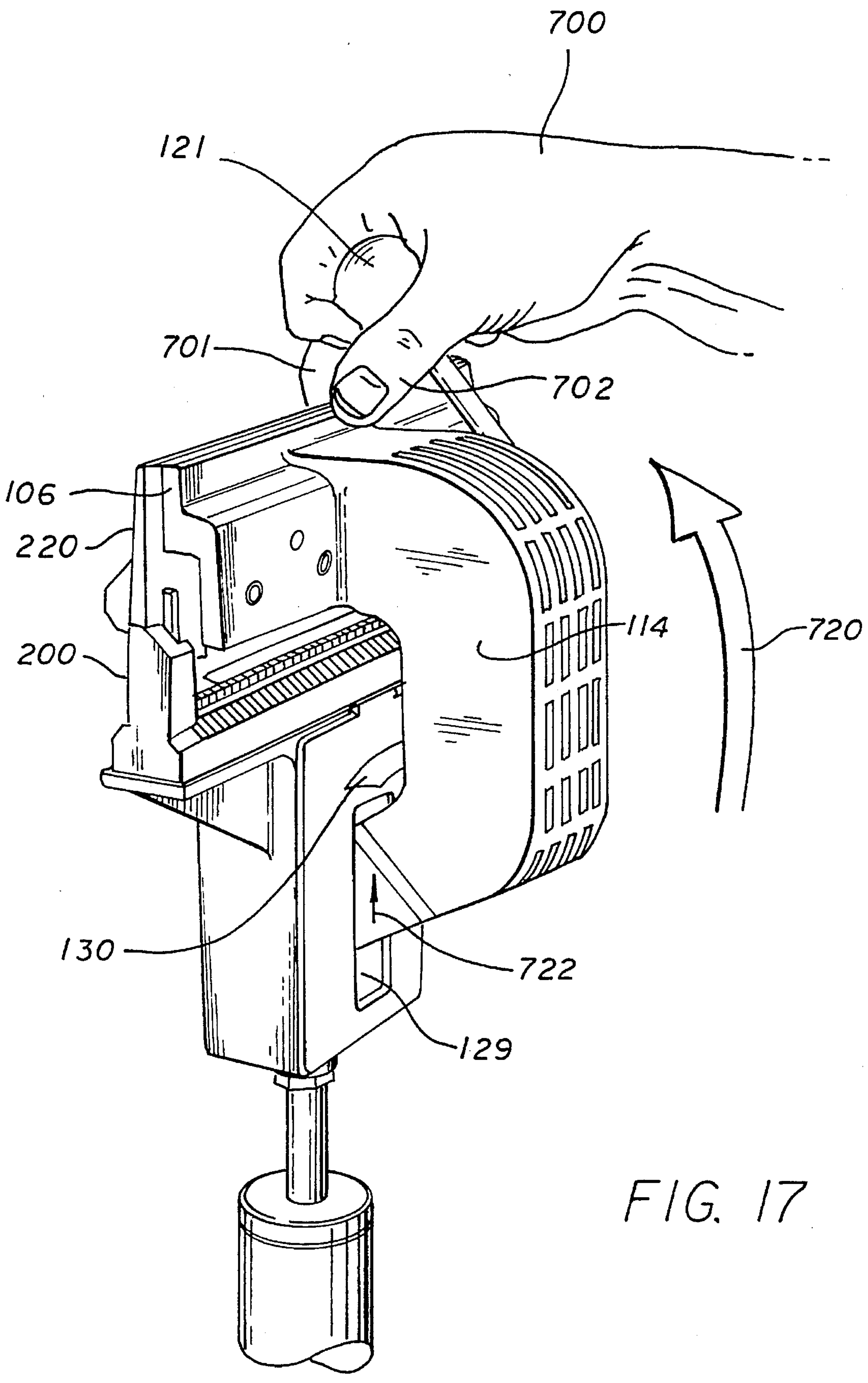
FIGS. 17 and 18 are perspective views of the tool shown in FIG. 1 with a vertical wire connector holder and force applicator installed thereon showing the operation of the tool.
Figure 18:
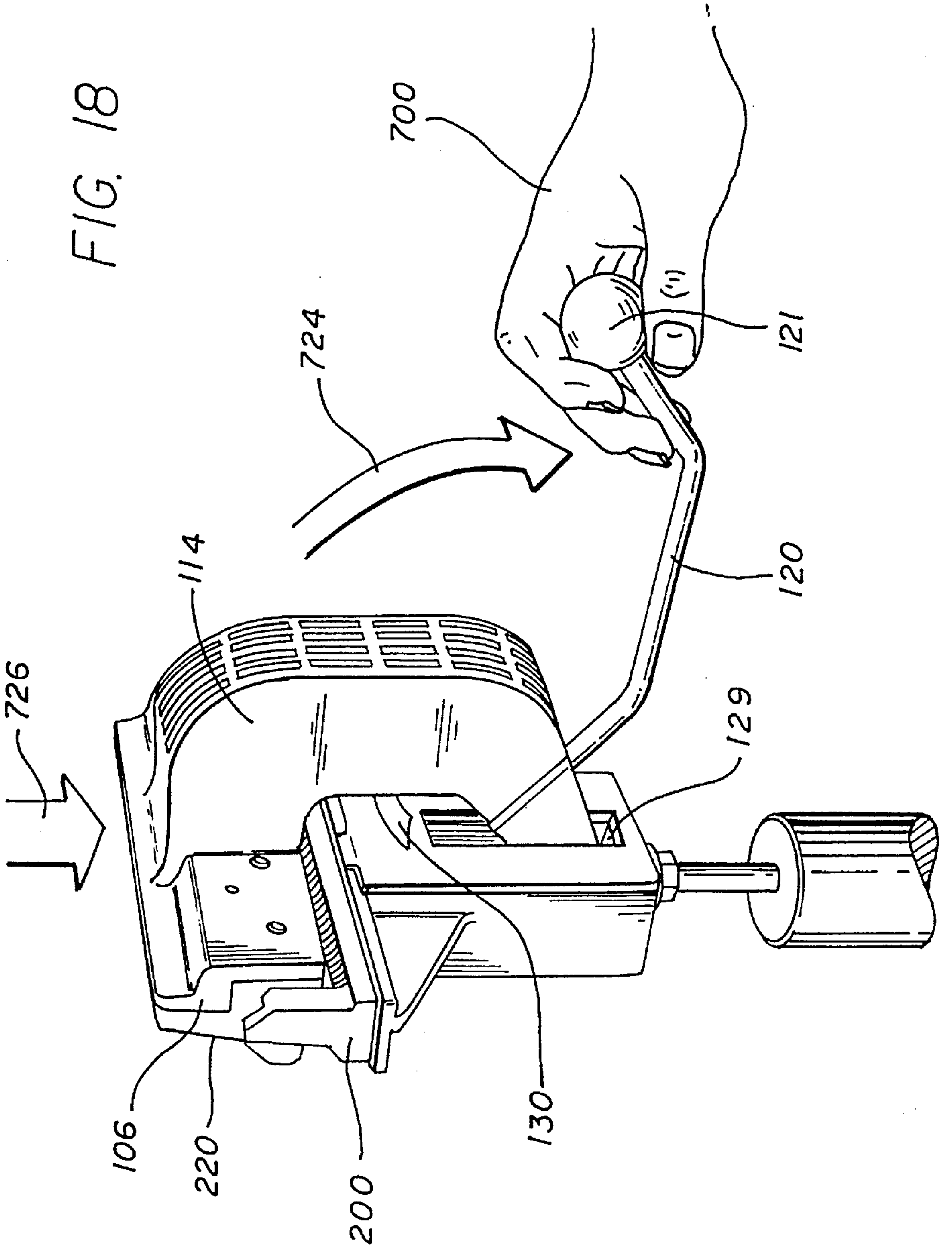

FIGS. 17 and 18 demonstrate the operation of the tool of the present invention utilizing a vertical connector holder 200. In FIG. 17, the T-bar and upper support 106 are moved into position above the vertical connector 200. In particular, the user's hand 700 grasps the lever knob 121 and, perhaps using a middle finger 701 and a thumb 702, pivots the T-bar 114 through an arcuate path defined by motion arrow 720 and at the same time moves the T-bar 114 in a vertical direction as shown by direction arrow 722. In this manner, the upper support 106 having the force applicator 220 disposed thereon will be moved into position above the vertical connector holder 200.

Turning to FIG. 18, with the upper support 106 and force applicator 220 resting on the connector holder 200, the application of force occurs by moving the force applicator lever 120 via the knob 121 in a downward fashion defined by the downward motion arrow 724. This motion of the lever 120 causes the upper support 106 and the force applicator 220 to move in a downward vertical direction defined by direction arrow 726. This causes force to be applied to a connector disposed on the vertical connector holder 200.

Figure 19:
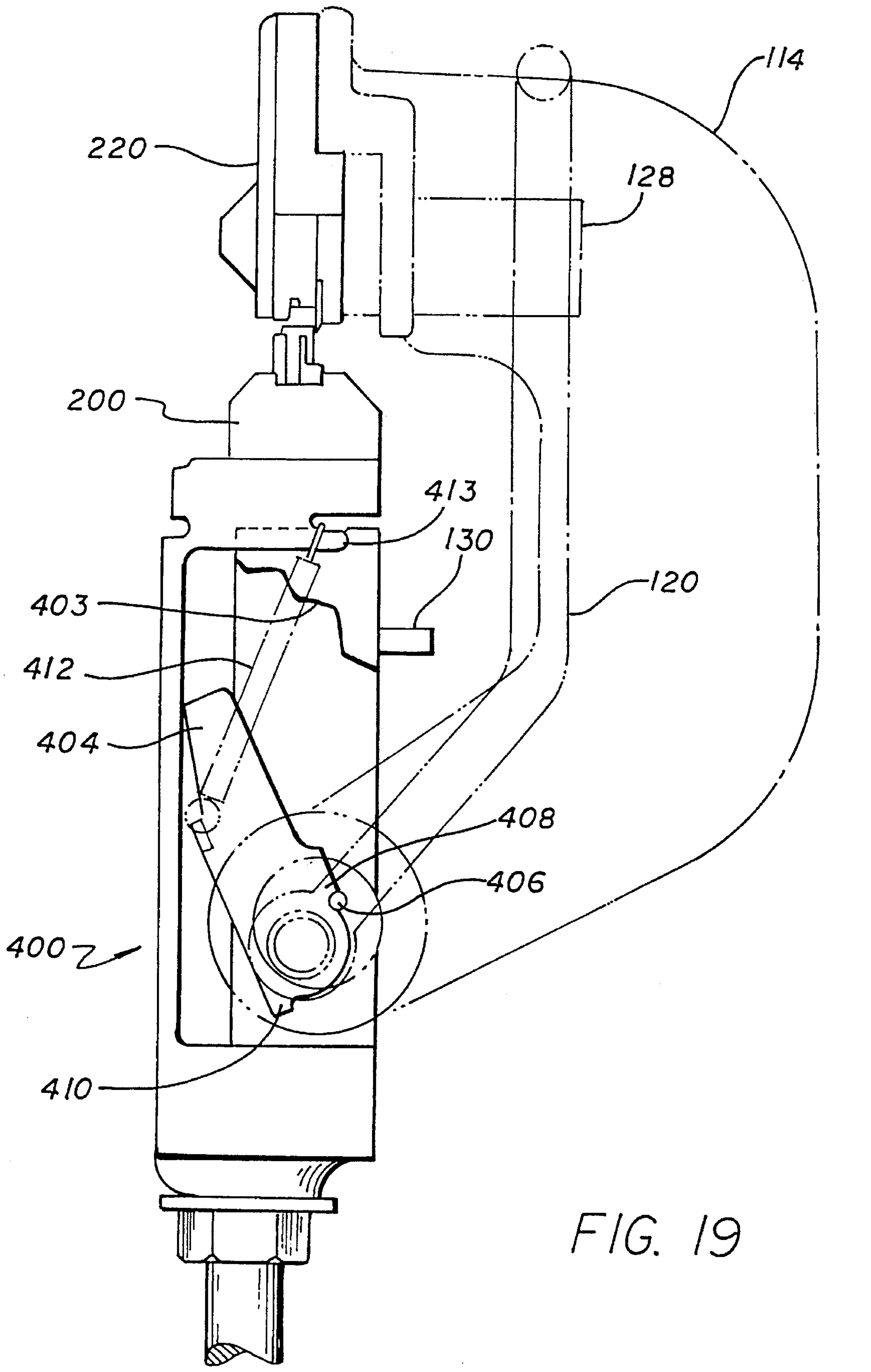
FIGS. 19–21 are partial side views of the tool shown in FIG. 1 with a vertical wire connector and force applicator installed thereon showing the operation of the cam mechanism during operation of the tool.
Figure 20:
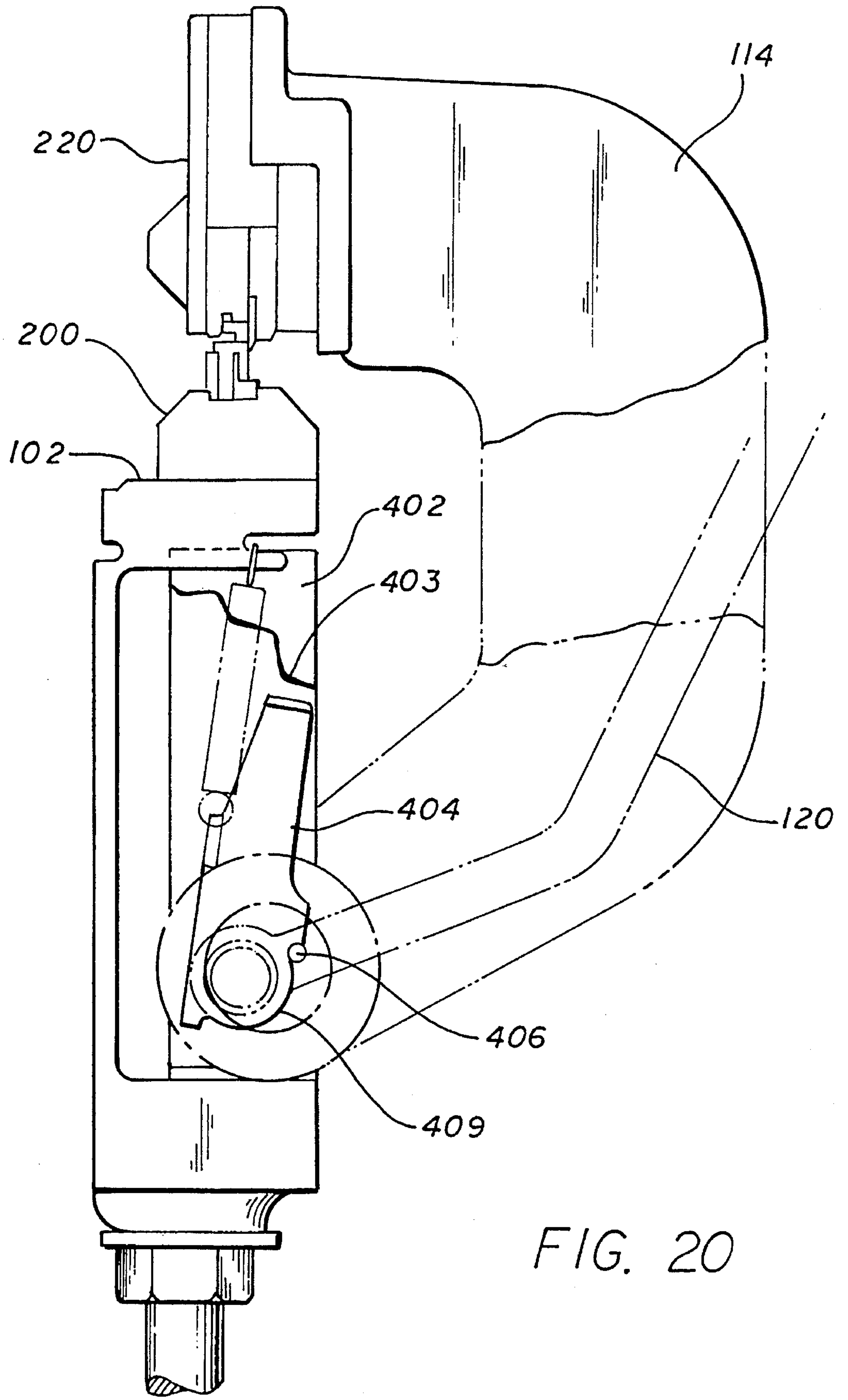
Figure 21:
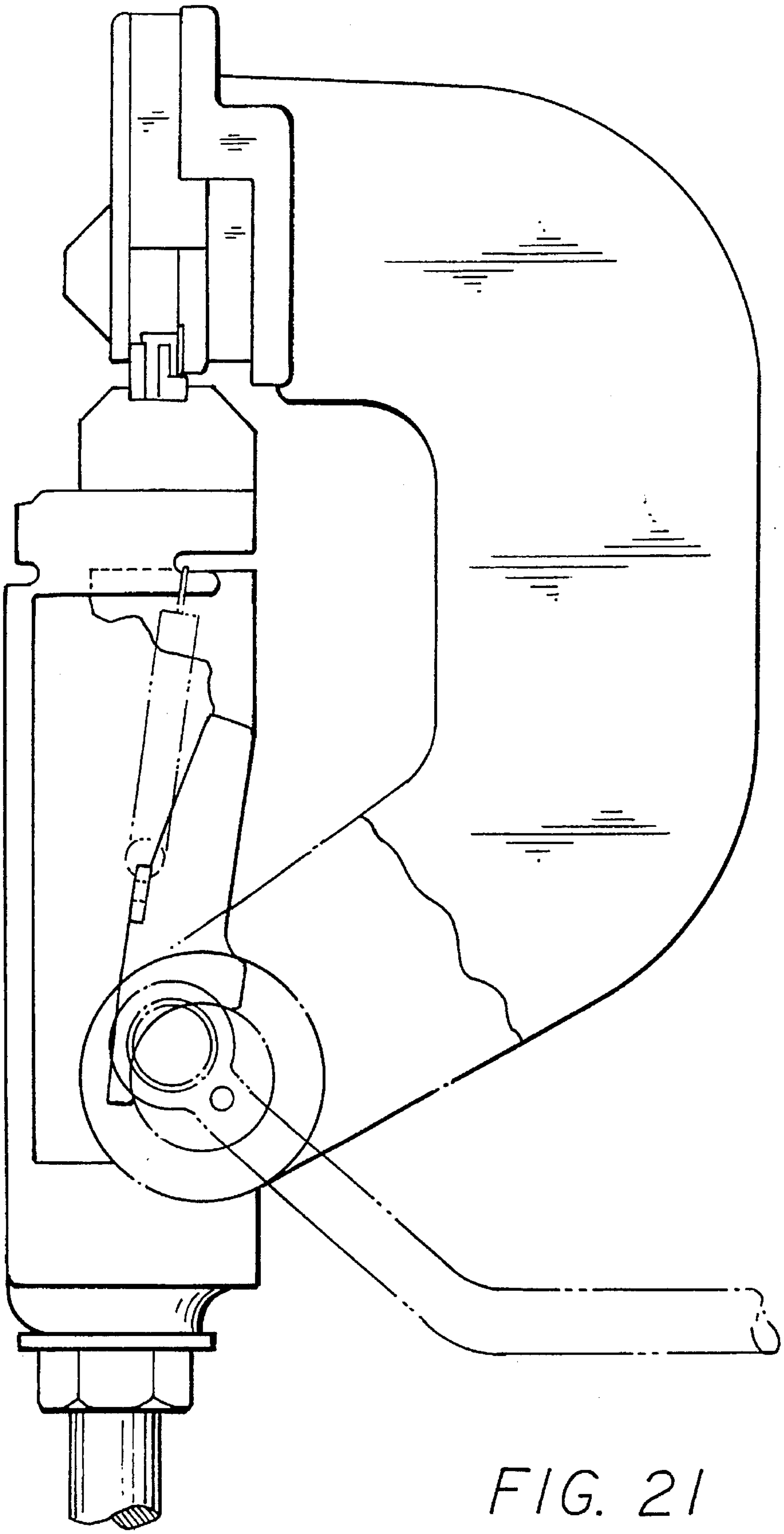

FIGS. 19–21 show the operation of the cam mechanism 400 throughout the range of motion of the T-bar 114. With the force applicator lever 120 positioned in the clamp 128, the guide rod 406 abuts the first rod limiter 408. This forces the fingers 404 away from the steps 403 on the stop member 402. This allows the T-bar 114 to be moved both pivotally relative to the cam mechanism 400 as well as vertically to properly position the force applicator relative to the connector holder as seen in FIG. 17. The force of the guide rod 406 against the first rod limiter 408 allows the finger members 404 to overcome the force of the spring 412 which tends to move the finger members in a direction towards the T-bar 114.

As the user begins to move the force applicator lever 120 downward to begin to apply force between the force applicator 220 and the wire connector holder 200, it is seen that the fingers 404 move towards the T-bar 114 and begin to engage one of the steps 403 on the stop members 402. At this point, the guide rod 406 begins to travel about the curved portion 409 of the finger member 404. This causes the finger members 404 to move in an upward fashion and abut the steps 403 on the stop member 402 and the upper support 106 and force applicator 220 moves downward, applying force to the connector. When the user is finished, the lever arm 120 is returned to the position shown in FIG. 19 and the device, including the T-bar is raised in the vertical direction and then pivoted outwardly away from the wire connector holder 200 in order to begin the next level of splicing or to remove the completed connector from the connector holder 200.

From the foregoing, it is clear that numerous modifications and/or adjustments can be made to the features of the preferred embodiment without departing from the spirit and scope of the present invention.

For example, although it has been discussed that the T-bar and housing, as well as most components associated therewith for the above-described embodiment are made from die-cast aluminum, it is clear that the present invention is not limited to a tool made with die cast aluminum and that any suitable material may be utilized. Furthermore, although the cable guide 600 has been described as being preferably made of plastic, it is also clear that the cable guide could be made from metal such as sheet metal or aluminum and still serve the same function.

In addition, although the present invention has been described in the preferred embodiment as using a cam mechanism to produce the pressing force, it would be readily apparent to one skilled in the art that a hydraulic mechanism could be substituted for the cam mechanism. The hydraulic mechanism could be used with both the two and three piece wire connector holders and force applicators, with attention being given to control the pressing force produced by the hydraulic mechanism so as not to produce excessive force when using either type of connector holder. This is particularly true given the different dimensions of the various connectors that could be utilized with the tool of the present invention.

The use of the springs to support the connector retainer 212 and to allow the connector retainer 212 to have a spring action is required when the connector retainer 212 needs to be moved below the surface of connector holder 200. This makes possible the use of bridge connections with the tool of the present invention.

As can be seen, there are numerous modifications and/or variations for the tool described above which may be made and still fall within the scope of the present invention. Indeed, the scope of the present invention is solely limited by the claims which are appended hereto. It is the inventor's intention that all such alternative embodiments fall within the scope of such claims.

I claim:

1. A method for using a tool for assembling a wire connector so as to connect a plurality of wire pairs together, the tool including a housing, a base plate supported by the housing and adapted to receive a removable wire connector holder, a T-bar pivotally connected at a first end thereof with said housing, and an upper support connected with a second end of the housing and adapted to receive a removable force applicator, said method comprising the steps of:

selecting a first type of removable wire connector holder in accordance with a first type of wire connector to be assembled;

selecting a first type of removable force applicator in accordance with at least one of a type of wire connector to be assembled and said selected first type of removable wire connector holder;

securing said first type of removable wire connector holder to said base plate;

securing said first type of removable force applicator to said upper support; and controlling at least a range of vertical movement of said T-bar so as to cause said first type of removable force applicator to apply a downward force against said first type of removable wire connector holder.

2. A method according to claim 1, further comprising the steps of:

removing the first type of removable wire connector holder from said base plate;

selecting a second type of removable wire connector holder in accordance with a second type of wire connector to be assembled; and securing said second type of removable wire connector holder to said base plate.

3. A method according to claim 2, further comprising the steps of:

removing the first type of removable force applicator from said upper support;

selecting a second type of removable force applicator in accordance with at least one of a type of wire connector to be assembled and said selected second type of removable wire connector holder; and securing said second type of removable force applicator to said upper support.

4. An apparatus for assembling a wire connector so as to connect a plurality of wire pairs together, said apparatus comprising:

a housing;

a base plate, disposed on said housing, adapted to receive a removable wire connector holder;

a T-bar, pivotally connected at a first end thereof with said housing, said T-bar being moveable relative to said housing;

an upper support, disposed at a second end of said T-bar, adapted to receive a removable force applicator;

a cam mechanism, disposed in said housing and movably connected with said T-bar, for controlling a range of vertical movement of said T-bar; and a force application lever movably connected with said cam mechanism, for causing said force applicator to apply a downward force against said removable wire connector holder.

5. The apparatus according to claim 4, wherein said apparatus includes means for removably securing a first type wire connector holder to said base plate.

6. The apparatus according to claim 5, wherein said first type wire connector holder comprises a three piece wire connector holder.

7. The apparatus according to claim 5, wherein said removable force applicator comprises a presser-cutter, and wherein said apparatus includes means for removably securing said presser-cutter to said upper support.

8. The apparatus according to claim 7, wherein said first type wire connector holder includes means for slidably engaging said removable force applicator so as to guide movement of said presser-cutter relative to said first type wire connector holder.

9. The apparatus according to claim 4, wherein said apparatus includes means for removably securing a second type wire connector holder to said base plate.

10. The apparatus according to claim 9, wherein said second type wire connector holder comprises a two piece wire connector holder.

11. The apparatus according to claim 9, wherein said removable force applicator comprises a pressing member, said apparatus including means for removably securing said pressing member to said upper support.

12. The apparatus according to claim 11, wherein said second type wire connector holder includes means for slidably engaging said pressing member so as to guide movement of said pressing member relative to said second type wire connector holder.

13. A tool for assembling wire connectors so as to connect a plurality of wire pairs together, said apparatus comprising:

a housing;

a removable wire connector holder;

a base plate disposed on said housing and adapted to receive said removable wire connector holder;

means, operatively connected to at least one of said base plate and said removable wire connector holder, for removably securing said removable wire connector holder to said base plate;

a T-bar pivotally connected at a first end thereof with said housing, said T-bar being vertically moveable relative to said housing;

a removable force applicator corresponding to said removable wire connector holder;

an upper support, disposed at a second end of said T-bar, adapted to receive said removable force applicator;

means, operatively connected to at least one of said upper support and said removable force applicator, for removably securing said removable force applicator to said upper support;

control means, operatively connected with said T-bar, for controlling at least a range of vertical movement of said T-bar; and force control means operatively connected with said control means for causing said upper support to apply a downward force against said base plate, said base plate having said removable wire connector holder removably secured thereto and said upper support having said removable force applicator removably secured thereto in accordance with a type of wire connector being used.

14. A tool according to claim 13, wherein said control means comprises a cam mechanism, disposed in said housing and movably connected with said T-bar, for controlling at least a range of vertical movement of said T-bar.

15. A tool according to claim 14, wherein said force control means comprises a force application lever, movably connected with said cam mechanism, for causing said upper support to apply a downward force against said base plate in accordance with a type of wire connector being used.

16. A tool according to claim 13, wherein said removable wire connector holder includes at least one of a vertical wire connector holder and a horizontal wire connector holder.

17. A tool according to claim 16, where said removable force applicator includes at least one of a presser-cutter, for applying a pressing force against a first wire connector positioned in a vertical wire connector holder removably secured to said base plate and for cutting excess wiring protruding from said first wire connector, and a pressing member for applying a pressing force against a second wire connector positioned in a horizontal wire connector holder removably secured to said base plate.

18. An apparatus for assembling a wire connector so as to connect a plurality of wire pairs together, said apparatus comprising:

a housing;

a base plate disposed on said housing adapted to receive a removable wire connector holder;

a T-bar, pivotally connected at a first end thereof with said housing, said T-bar being moveable relative to said housing;

an upper support, disposed at a second end of said T-bar, adapted to receive a removable force applicator;

a cam mechanism, disposed in said housing and movably connected with said T-bar, for controlling at least a range of vertical movement of said T-bar; and cam mechanism adjustment means disposed in said housing and operatively connected to said cam mechanism for adjusting a relative position of said upper support on said T-bar with said base plate.

19. The apparatus according to claim 18, wherein said cam mechanism includes a pair of stop members disposed in said housing, said pair of stop members being adjustably connected with said housing, and wherein said cam mechanism adjustment means comprises means for adjusting the relative position of at least one of said pair of stop members relative to said housing.

20. The apparatus according to claim 19, wherein each of said pair of stop members includes a threaded hole formed therein, said cam mechanism adjustment means including at least one cam adjustment screw, accessible from an exterior of said housing and mating with at least one of said threaded holes, for adjusting the position of at least one of said pair of stop members relative to said housing.

21. A wire connector holder adapted to be attached to a wire connector tool having a housing and a base plate supported by said housing, the wire connector holder comprising:

a base member;

a pair of lateral side rails extending upwardly from said base member;

a slot disposed in said base member for laterally securing a wire connector therein;

a vertical retaining member for preventing vertical movement of a wire connector disposed in said slot, said vertical retaining member comprising a metal band which extends partially about a circumference of said base member such that a portion of said band over hangs said slot, said band being formed so as to provide a bias force in a lateral direction relative to said slot; and means for removably securing said wire connector holder to said wire connector tool.

22. A wire connector holder according to claim 21, wherein said base member and said slot are adapted to receive a 20 pair wire connector.

23. A wire connector holder according to claim 21, wherein said base member and said slot are adapted to receive a 25 pair wire connector.

24. A wire connector holder according to claim 21, wherein said means for removably securing comprises a threaded coupling including a threaded hole disposed in said base member and a threaded bolt, said threaded bolt being passed through an opening formed in said base plate and coupling with said threaded hole in said base member so as to removably secure said base member to said base plate.

25. A wire connector holder adapted to be attached to a wire connector tool having a housing and a base plate supported by said housing, the wire connector holder comprising:

a base member;

a pair of lateral side rails extending upwardly from said base member;

a pair of vertical slots, each slot being disposed in one of said pair of lateral side rails for receiving a respective pair of members extending from a horizontal wire connector;

a wire guide, removably securable to said base member, for guiding a plurality of wires to be connected using said horizontal wire connector; and means for removably securing said wire connector holder to said wire connector tool.

26. A wire connector holder according to claim 25, wherein said means for removably securing comprises a threaded coupling including a threaded hole disposed in said base member and a threaded bolt, said threaded bolt being passed through an opening formed in said base plate and coupling with said threaded hole in said base member so as to removably secure said base member to said base plate.

* * * * *